(12) United States Patent
Falconer et al.

(10) Patent No.: US 8,302,782 B2
(45) Date of Patent: Nov. 6, 2012

(54) SYNTHESIS OF ZEOLITES AND ZEOLITE MEMBRANES USING MULTIPLE STRUCTURE DIRECTING AGENTS

(75) Inventors: John L. Falconer, Boulder, CO (US); Moises A. Carreon, Louisville, KY (US); Shiguang Li, Mount Prospect, IL (US); Richard D. Noble, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 573 days.

(21) Appl. No.: 12/044,116

(22) Filed: Mar. 7, 2008

(65) Prior Publication Data

US 2008/0216650 A1  Sep. 11, 2008

Related U.S. Application Data

(60) Provisional application No. 60/894,011, filed on Mar. 9, 2007.

(51) Int. Cl.
| | |
|---|---|
| *B01D 39/00* | (2006.01) |
| *B01D 29/46* | (2006.01) |
| *B01D 39/06* | (2006.01) |
| *B29C 65/00* | (2006.01) |
| *B29C 44/04* | (2006.01) |

(52) U.S. Cl. .................. 210/500.25; 210/490; 264/45.1; 264/42; 55/523

(58) Field of Classification Search ............. 210/500.25, 210/500.26, 490, 650; 264/41, 42, 45.1; 502/4, 60, 64; 427/426, 372.2, 430.1, 435; 95/45–52; 55/223–224, 523–524
See application file for complete search history.

(56) References Cited

U.S. PATENT DOCUMENTS

| | | | |
|---|---|---|---|
| 3,404,086 | A | 10/1968 | Plank et al. |
| 3,644,200 | A | 2/1972 | Young |
| 4,414,005 | A | 11/1983 | De Bievre et al. |
| 4,440,871 | A | 4/1984 | Lok et al. |
| 4,775,396 | A | 10/1988 | Rastelli et al. |
| 5,100,596 | A * | 3/1992 | Haag et al. ............. 506/22 |
| 5,143,876 | A | 9/1992 | Chang et al. |
| 5,248,647 | A | 9/1993 | Barger |

(Continued)

FOREIGN PATENT DOCUMENTS

CN   1106715   8/1995

(Continued)

OTHER PUBLICATIONS

Shiguang Li et al, Hig-Pressure Co2/CH4 Separation Using SAPO-34 Membranes; Indurstrial Chemical Res.200005 , 44, 3220-3228.*

(Continued)

*Primary Examiner* — Ana Fortuna
(74) *Attorney, Agent, or Firm* — Greenlee Sullivan P.C.

(57) ABSTRACT

SAPO-34 membranes and methods for their preparation and use are described. The SAPO-34 membranes are prepared by contacting at least one surface of a porous membrane support with a synthesis gel comprising a first and a second templating agent. SAPO-34 crystals having a narrow size distribution were applied to the surface of the support prior to synthesis. A layer of SAPO-34 crystals is formed on at least one surface of the support. SAPO-34 membranes of the invention can have improved selectivity for certain gas mixtures, including mixtures of carbon dioxide and methane.

21 Claims, 15 Drawing Sheets

U.S. PATENT DOCUMENTS

| | | | |
|---|---|---|---|
| 5,296,208 | A | 3/1994 | Lesch |
| 5,362,522 | A | 11/1994 | Barri et al. |
| 5,464,798 | A | 11/1995 | Jia et al. |
| 5,557,030 | A | 9/1996 | Markovs et al. |
| 5,567,664 | A * | 10/1996 | Barri et al. ............... 502/4 |
| 5,605,631 | A * | 2/1997 | Barri et al. ............... 210/650 |
| 5,716,527 | A | 2/1998 | Deckman et al. |
| 5,779,904 | A | 7/1998 | Ruderman et al. |
| 5,785,947 | A | 7/1998 | Zones et al. |
| 5,824,617 | A | 10/1998 | Lai |
| 5,830,429 | A * | 11/1998 | Balkus et al. ............... 423/702 |
| 5,871,650 | A | 2/1999 | Lai et al. |
| 5,935,440 | A * | 8/1999 | Bratton et al. ............ 210/500.25 |
| 6,051,745 | A | 4/2000 | Wu et al. |
| 6,051,746 | A | 4/2000 | Sun et al. |
| 6,074,457 | A | 6/2000 | Anthonis et al. |
| 6,090,289 | A | 7/2000 | Verduijn et al. |
| 6,140,263 | A | 10/2000 | Anstett et al. |
| 6,177,373 | B1 * | 1/2001 | Sterte et al. ............... 502/4 |
| 6,193,784 | B1 | 2/2001 | Yazawa et al. |
| 6,472,016 | B1 | 10/2002 | Soria et al. |
| 6,503,294 | B2 * | 1/2003 | Yoshikawa et al. ............... 95/45 |
| 6,514,899 | B1 | 2/2003 | Mertens et al. |
| 6,660,682 | B2 * | 12/2003 | Cao et al. ............... 502/214 |
| 6,696,032 | B2 | 2/2004 | Mertens et al. |
| 6,756,516 | B2 | 6/2004 | Mees et al. |
| 6,767,384 | B1 | 7/2004 | Vu et al. |
| 6,897,180 | B2 | 5/2005 | Mees et al. |
| 6,903,240 | B2 | 6/2005 | Mertens et al. |
| 7,011,810 | B2 | 3/2006 | Dakka et al. |
| 7,014,587 | B2 | 3/2006 | Grundl et al. |
| 7,014,827 | B2 | 3/2006 | Mertens et al. |
| 7,087,794 | B2 * | 8/2006 | Risch et al. ............... 568/405 |
| 7,309,806 | B2 | 12/2007 | Loezos et al. |
| 7,309,906 | B1 * | 12/2007 | Tyhach et al. ............... 257/532 |
| 7,316,727 | B2 * | 1/2008 | Falconer et al. ............... 95/51 |
| 7,828,875 | B2 | 11/2010 | Li et al. |
| 7,909,917 | B2 | 3/2011 | Nonaka et al. |
| 2003/0149321 | A1 | 8/2003 | Mees et al. |
| 2003/0220188 | A1 | 11/2003 | Marand |
| 2004/0215044 | A1 | 10/2004 | Mertens et al. |
| 2005/0003956 | A1 | 1/2005 | Fuglerud et al. |
| 2005/0171394 | A1 | 8/2005 | Fuglerud et al. |
| 2005/0204916 | A1 * | 9/2005 | Falconer et al. ............... 95/51 |
| 2005/0229779 | A1 | 10/2005 | Nakayama et al. |
| 2006/0079725 | A1 * | 4/2006 | Li et al. ............... 585/818 |
| 2006/0252631 | A1 | 11/2006 | Deckman et al. |
| 2007/0265484 | A1 | 11/2007 | Li et al. |
| 2009/0007780 | A1 | 1/2009 | Yajima et al. |
| 2010/0102001 | A1 | 4/2010 | Falconer et al. |
| 2010/0116130 | A1 | 5/2010 | Carreon et al. |
| 2011/0113958 | A1 | 5/2011 | Carreon et al. |
| 2012/0006194 | A1 | 1/2012 | Falconer et al. |

FOREIGN PATENT DOCUMENTS

| | | |
|---|---|---|
| CN | 1167005 A | 12/1997 |
| JP | 2001-146416 A | 5/2001 |
| RU | 2174044 | 9/2001 |
| RU | 2179064 | 2/2002 |
| RU | 2183499 | 6/2002 |
| WO | WO94/25152 | 11/1994 |
| WO | WO 97/25129 | 7/1997 |
| WO | WO 97/33684 | 9/1997 |
| WO | WO97/37752 A | 10/1997 |
| WO | WO 00/06493 | 2/2000 |
| WO | WO 02/074421 | 9/2002 |
| WO | WO 03/048042 | 6/2003 |
| WO | WO 2004/096709 | 11/2004 |
| WO | WO 2007/134094 | 11/2007 |
| WO | WO 2008/112520 | 9/2008 |

OTHER PUBLICATIONS

Ahn et al. (Aug. 1, 2006) "Pervaporation of Dichlorinated Organic Compounds Through Silicalite-1 Zeolite Membrane," *J. Membr. Sci.* 279(1-2):459-465.

Aoki et al. (1998) "Gas Permeation Properties of A-Type Zeolite Membrane Formed on Porous Substrate by Hydrothermal Synthesis," *AIChe J.* 141:197-205.

Australian Patent Office Search Report Corresponding to Application No. SG 200808108-5, Mailed Dec. 1, 2009.

Baerlocher et al. (2001) *Atlas of Zeolite Framework Types*, 5th ed., Elsevier, Amsterdam www.iza-structure.org/databases/ , 1442, 1464, 38117.

Bakker et al. (1996) "Permeation Characteristics of a Metal-Supported Silicalite-1 Zeolite Membrane," *J. Membrane Sci.* 117:57-78.

Breck, D.W. (1974) *Zeolite Molecular Sieves*, Krieger Publishing Company. Malabar, Florida, pp. 460-465,498-503,570-573.

Buchholz et al. (2004) "Sequential Steps of Ammoniation of the Microporous Silicoaluminophosphates H-SAPO-34 and H-SAPO-37 Investigated by in Situ CF MAS NMR Spectroscopy," *J. Phys. Chem. B* 108:3107-3113.

Camblor et al. (1998) Synthesis and Structural Characterization of MWW Type Zeolite ITQ-1, the Pure Silica Analog of MCM-22 and SSZ-25 *J. Phys. Chem. B* 102(1):44-51.

Carreon et al. (2008) "Alumina-Supported SAPO-34 Membranes for $CO_2/CH_4$ Separation," *J. Am. Chem. Soc.* 130:5412-5413 (plus Supporting Information).

Carreon et al. (2008) "SAPO-34 Seeds and Membranes Prepared Using Multiple Structure Directing Agents," *Adv. Mater.* 20:729-732 (plus Supporting Information).

Dyer et al. (1988) *An Introduction to Zeolite Molecular Sieves*, John Wiley and Sons, New York, pp. 1-3, 12-15,20-25,36-37,54,57,118-124.

Eurasian Search Report Corresponding to Russian Application No. 200802326, Mailed Dec. 9, 2009.

Flanigan et al. (1986) "Aluminophosphate Molecular Sieves and the Periodic Table," *Pure Appl. Chem.* 58(10):1351-1358.

Guan et al. (2002) "Separation of Nitrogen From Oxygen Using A Titanosilicate Membrane Prepared on a Porous α-Alumina Support Tube," *Sep. Sci. Technol.* 37(5):1031-1039.

Gues et al. (1992) "Synthesis and Characterization of Zeolite (MFI) Membranes on Porous Ceramic Supports," *J. Chem. Soc. Faraday Trans.* 88:3101-3109.

Gump et al. (2001) "Aromatic Permeation Through Crystalline Molecular Sieve Membranes," *Ind. Engr. Chem. Res.* 40(2):565-577.

Gump et al. (2000) "$CO_2$, Separation Using Zeolite Membranes," *Proceedings of Coal Research Contractors Review Meeting*, Jun. 6-7, 2000, http://www.netl.doe.gov/publications/proceedings/00/ucr00/noble.pdf , Accessed Jun. 17, 2010.

Ha et al. (2000) "Facile Assembly of Zeolite Monolayers on Glass, Silica, Alumina, and Other Zeolites Using 3-Halopropylsily Reagents as Covalent Linkers," *Adv. Mater.* 12(15):1114-1117.

Hedlund et al. (2002) "High-Flux MFI Membranes," *Micro. Meso. Mater.* 52:179-189.

International Search Report Corresponding to International Application No. PCT/US08/56143, Mailed Jun. 5, 2008.

International Search Report Corresponding to International Application No. PCT/US05/027530, Mailed Oct. 10, 2006.

International Search Report, Corresponding to International Application No. PCT/US07/68542, Mailed May 8, 2008.

Jhung et al. (2003) "Selective Formation of SAPO-5 and SAPO-34 Molecular Sieves with Microwave Irradiation and Hydrothermal Heating," *Micro. Meso. Mater.* 64:33-39.

Jia et al. (1993) "Ceramic Zeolite Composite Membranes," *J. Membr. Sci.* 82:15-26.

Kang et al. (2002) "Intrapore Synthesis of Silicalite Membranes at Temperatures Below 100° C.," *Ind. Eng. Chem. Res.* 41:3145-3150.

Kärger et al. (1992) *Diffusion in Zeolites*, John Wiley and Sons, New York, pp. 9-10.

Keizer et al. (1998) "Two Component Permeation Through Thin Zeolite MFI Membranes," *J. Memb. Sci.* 147:159-172.

Kusakabe et al. (1997) "Formation of a Y-Type Membrane on a Porous α-Alumina Tube for Gas Separation," *Ind. Eng. Chem. Res.* 36:649-655.

Li et al. (Web Release Feb. 1, 2010) "Scale-Up of SAPO-34 Membranes for $CO_2/CH_4$ Separation," *J. Membr. Sci.* 352(1-2):7-13.

Li et al. (2002) "ZSM-11 Membranes: Characterization and Pervaporation Performance for Alcohol/Water Mixtures," *AIChE J.* 48:269-278.

Li et al. (2004) "SAPO-34 Membranes for $CO_2/CH_4$ Separation," *J. Memb. Sci.* 241:121-135.

Li et al. (2005) "Effects of Impurities on $CO_2/CH_4$ Separations Through SAPO-34 Membranes," *J. Membr. Sci.* 251:59-66.

Li et al. (2005) "High-Pressure $CO_2/CH_4$ Separation Using SAPO-34 Membranes," *Ind. Eng. Chem. Res.* 44(9):3220-3228.

Li et al. (Oct. 2006) "Improved SAPO-34 Membranes for $CO_2/CH_4$ Separations," *Adv. Mater.* 18(19):2601-2603.

Lin et al. (2001) "Silicalite Membrane Preparation, Characterization, and Separation Performance," *Ind. Eng. Chem. Res.* 40:4069-4078.

Lixiong et al. (1997) "Synthesis of SAPO-34/Ceramic Composite Membranes," *Stud. Surf. Sci. Catl.* 105:2211-2215.

Mabande et al. (Web Release Oct. 26, 2005) "Preparation of b-Oriented MFI Films on Porous Stainless Steel Substrates," *Ind. Eng. Chem. Res.* 44(24):9086-9095.

Masuda et al. (1995) "Preparation of an A-Type Zeolite Film on the Surface of an Alumina Ceramic Filter," *Microporous Mat.* 3:565-571.

Masuda et al. (1994) "Preparation of a Dense ZSM-5 Zeolite Film on the Outer of an Alumina Ceramic Filter," *Appl. Catal.* 111:143-150.

Mees et al. (2003) "Improvement of the Hydrothermal Stability of SAPO-34," *Chem. Commun.* 1:44-45.

Mees et al. (2002) "Electronic Supplementary Information (ESI) on the Synthesis Procedure," *Supp. Material for Chem. Commun.*

Meriaudeau et al. (1997) "SAPO-11, SAPO-31, and SAPO-41 Molecular Sieves: Synthesis, Characterization, and Catalytic Properties in n-Octane Hydroisomerization," *J. Catalysis* 169:55-66.

Poshusta et al. (1998) "Synthesis and Permeation Properties of SAPO-34 Tubular Membranes," *Ind. Eng. Chem. Res.* 37:3924-3929.

Poshusta et al. (1999) "Temperature and Pressure Effects on $CO_2$ and $CH_4$ Permeation Through MFI Zeolite Membranes," *J. Membr. Sci.* 160:115-125.

Poshusta et al. (2001) "Characterization of SAPO-34 Membranes by Water Absorption," *J. Membr. Sci.* 186:25-40.

Poshusta et al. (2000) "Separation of Light Gas Mixtures Using SAPO-34 Membranes," *AIChe J.* 46(4):779-789.

Prakash et al. (1994) "Synthesis of SAPO-34: High Silicon Incorporation in the Presence of Morpholine as Template," *J. Chem. Soc. Faraday Trans.* 90(15):2291-2296.

Prakash, A.M. "Recipe for SAPO-34," http://www.iza-synthesis.org/Recipies/SAPO-34.html, Accessed Jan. 15, 2004.

Robeson et al. (Oct. 1, 1991) "Correlation of Separation Factor Versus Permeability for Polymeric Membranes," *J. Membr. Sci.* 62(2):165-185.

Sano et al. (1992) "Synthesis and Characterization of Polycrystalline SAPO-5 Film," *J. Mol. Cat.* 77:L19-L26.

Sherman, J.D. (1999) "Synthetic Zeolites and Other Microporous Oxide Molecular Sieves," *Proc. Natl. Acad. Sci. USA* 96:3471-3478.

Singh et al. (2003) In; *Handbook of Zeolite Science and Technology*, Auerbach et al Eds., Marcel Dekker, Inc., New York, pp. 27-31.

Supplementary European Search Report, Corresponding to European Application No. EP 07 76 2043, Completed Apr. 14, 2010.

Supplementary European Search Report, Corresponding to European Application No. EP 05 77 8609, Completed Mar. 25, 2008.

Szostak, R. (1998) "Synthesis of Molecular Sieve Phosphates," In, "Recent Advances in the Understanding of Zeolite Synthesis," in, *Molecular Sieves, Science and Technology*, Karge et al. Eds., Springer-Verlag, Berlin pp. 161-165.

Thompson, R.W. (1998) "Recent Advances in the Understanding of Zeolite Synthesis," in, *Molecular Sieves, Science and Technology*, Karge et al. Eds., Springer-Verlag, Berlin, pp. 1-33.

Tomita et al. (2004) "Gas Separation Characteristics of DDR Type Zeolite Membrane," *Micropor. Mesopor. Mater.* 68:71-75.

Tsai et al. (1998) "Well-Aligned SAPO-5 Membrane: Preparation and Characterization," *Micropor. Mesopor. Mat.* 22:333-341.

Tuan et al. (2002) "Separating Organics From Water by Pervaporation with Isomorphously-Substituted MFI Zeolite Membranes," *Mem. Sci.* 196:111-123.

Van den Broeke et al. (1999) "Transport and Separation Properties of a Silicalite-1 Membrane, I. Operating Conditions," *Chem. Eng. Sci.* 54:245-258.

Vomscheid et al. (1995) "Reversible Interaction of $NH_3$ with the Framework of Template-Free Zeolite-Type SAPO-34," *J. Chem. Soc. Faraday Trans.* 91(18):3281-3284.

Weh et al. (2002) "Change of Gas Permeation by Photoinduced Switching of Zeolite-Azobenzene Membranes of Type MFI and FAU," *Micropor. Mesopor. Mater.* 54:15-26.

Weh et al. (2002) "Permeation of Single Gases and Gas Mixtures Through Faujasite-Type Molecular Sieve Membranes," *Micropor. Mesopor. Mater.* 54:27-36.

Wilson, S.T. (2001) "Templating in Molecular Sieve Synthesis," In; *Verified Synthesis of Zeolitic Materials*, Robson, H. Ed., Elsevier, 27-31.

Wong et al. (2001) "Effect of Synthesis Parameters on the Zeolite Membrane Morphololgy," J. Membr. Sci., 193, 141-161.

Written Opinion, Corresponding to International Application No. PCT/US08/56143, Mailed Jun. 5, 2008.

Written Opinion, Corresponding to International Application No. PCT/US07/68542, Mailed May 8, 2008.

Xomeritakis et al. (2000) "Transport Properties of Alumina-Supported MFI Membranes Made by Secondary (Seeded) Growth," *Micropor. Mesopor. Mater.* 38:61-73.

Yan et al. (1995) "Zeolite ZSM-5 Membranes Grown on Porous $\alpha$-$Al_2O_3$," *JCS Chem. Commun.* 2:227-228.

Zecchina et al. (1997) "Vibrational Spectroscopy of $NH_4+$ Ions in Zeolitic Materials: An IF Study," *J. Phys. Chem. B* 101:10128-10135.

Zhu et al. (1999) "Shape Selectivity in the Adsorption of Propane/Propene on the All-Silica DD3r," *Chem. Commun.* 1453-2454.

Zones et al. (2002) Synthesis of High Silica Zeolites Using a Mixed Quaternary Ammonium Cation, Amine Approach: Discovery of Zeolite SSZ-47 *Chem. Mater* 14(1):313-320.

Zones et al. (May 4, 2001) "Studies of the Synthesis of SSZ-25 Zeolite in 'Mixed-Template' System," *Chem. Eur. J.* 7(9):1990-2001.

Office Action Corresponding to U.S. Appl. No. 11/746,191, mailed Mar. 17, 2011.

Response to Office Action in U.S. Appl. No. 11/746,191, filed Jul. 18, 2011.

Li et al. (2008) "SAPO-34 Membranes for CO2/CH4 separations: Effect of Si/Al ratio," *Microporous Mesoporous Mater.* 110:310-317.

McLeary et al. (Feb. 2006), "Zeolite based films, membranes and membrane reactors: Progress and prospects," *Microporous Mesoporous Mater.*, 90 (1-2), 198-220.

\* cited by examiner

US 8,302,782 B2

SYNTHESIS OF ZEOLITES AND ZEOLITE MEMBRANES USING MULTIPLE STRUCTURE DIRECTING AGENTS

CROSS-REFERENCE TO RELATED APPLICATIONS

This application claims the benefit of U.S. Provisional Application 60/894,011 filed Mar. 9, 2007, which is incorporated by reference to the extent not inconsistent with the disclosure herein.

BACKGROUND OF THE INVENTION

This invention is in the field of silicoaluminophosphate (SAPO) zeolites, in particular SAPO-34 zeolite membranes prepared on a porous support. The invention provides supported SAPO-34 membranes as well as methods for making and using them.

SAPOs are largely composed of Si, Al, P and O and can have a three-dimensional microporous crystal framework structure of $PO_2^+$, $AlO_2^-$ and $SiO_2$ tetrahedral units. The cages, channels and cavities created by the crystal framework can permit separation of mixtures of molecules based on their effective sizes.

SAPO crystals can be synthesized by hydrothermal crystallization from a reaction mixture containing reactive sources of silica, alumina, and phosphate, and an organic templating agent. Lok et al. (U.S. Pat. No. 4,440,871) report gel compositions and procedures for forming several types of SAPO crystals, including SAPO-5, SAPO-11, SAPO-16, SAPO-17, SAPO-20, SAPO-31, SAPO-34, SAPO-35, SAPO-37, SAPO-40, SAPO 41, SAPO-42, and SAPO-44 crystals. Lok et al. list a number of potential organic templating agents and report the use of mixtures of these organic templating agents.

Mertens et al. (U.S. Pat. No. 7,014,587) report a process for the synthesis and recovery of SAPO and aluminophosphate (ALPO) molecular sieve crystals. Mertens et al. list several nitrogen-containing organic templating agents and report the use of combinations of templating agents. Published U.S. Patent Application 2004/0215044 reports methods and compositions of synthesis of ALPO and SAPO crystals. The application discloses synthesis mixture compositions having two or more organic templates present at a molar ratio of total template to aluminum of less than or equal to 1.25.

Prakash and Unnikrishnan report gel compositions and procedures for forming SAPO-34 crystals. (Prakash, A. M. and Unnikrishnan, S., J. Chem. Sc. Faraday Trans., 1994, 90(15), 2291-2296). In several of Prakash and Unnikrishnan's reported procedures, the gel was aged for 24 hours at 27° C. (300 K).

Use of multiple templating agents for zeolite crystal formation has also been reported for zeolite systems other than SAPO-34. Corma et al. and Davis et al. report synthesis of MWW type zeolites using adamantammonium cation as the primary template and several amines as secondary organic additives (M. A. Camblor, A. Corma, M. J. Diaz-Cabanas, C. Baerlocher, J. Phys. Chem. B 102, 44 (1998); S. I. Zones, S.-J. Hwang, M. E. Davis, Chem. Eur. J. 7, 1990 (2001)). They found that the secondary SDA increased crystallization rates, and this enhanced the stabilization and crystallinity of the final MWW structure. Zones et al. report a synthesis system for high silica zeolites (including SSZ-47) in which a minor amount of quaternary ammonium structure-directing agent is used to specify the nucleation product, and then a larger amount of an amine is used to provide both pore filling and basicity capacities in the synthesis (S. I. Zones, S.-J. Hwang, Chem. Mater. 14, 313 (2002)).

SAPO membranes have been proposed for use in gas separations. For these applications, an important parameter is the separation selectivity. For two gas components i and j, a separation selectivity $S_{i/j}$ greater than one implies that the membrane is selectively permeable to component i. If a feedstream containing both components is applied to one side of the membrane, the permeate stream exiting the other side of the membrane will be enriched in component i and depleted in component j. The greater the separation selectivity, the greater the enrichment of the permeate stream in component i.

Barri et al. report supported zeolite membranes (U.S. Pat. No. 5,567,664) and methods for the production of zeolite membranes on porous supports (U.S. Pat. No. 5,362,522). Barri et al. state that any type of zeolite-type material may be used, including silicoaluminophosphates.

SAPO-34 membranes on porous supports have been reported in the scientific literature. Lixiong et al. (Stud. Surf. Sci. Catl., 1997, 105, p 2211) reported synthesis of a SAPO-34 membrane on one side of a porous $\alpha\text{-}Al_2O_3$ disk by immersing the substrate surface in a hydrogel and heating the substrate and gel. Lixiong et al. reported single gas permeances for $H_2$, $N_2$, $CO_2$, and $n\text{-}C_4H_{10}$. Poshuta et al. (Ind. Eng. Chem. Res., 1998, 37, 3924-3929; AlChE Journal, 2000, 46(4), 779-789) reported hydrothermal synthesis of SAPO-34 membranes on the inside surface of asymmetric, porous $\alpha\text{-}Al_2O_3$ tubes. Poshuta et al. (supra) reported single gas and mixture permeances and ideal and mixture selectivities for several gases, including $CO_2$ and $CH_4$. The $CO_2/CH_4$ selectivities reported for a 50/50 $CO_2/CH_4$ mixture at 300K were between 14 and 36 for a feed pressure of 270 kPa and a pressure drop of 138 kPa (Poshusta et al., AlChE Journal, 2000, 46(4), pp 779-789). The $CO_2/CH_4$ selectivity was attributed to both competitive absorption (at lower temperatures) and differences in diffusivity. Li et al. reported an average $CO_2/CH_4$ selectivity of 76+/−19 for a 50/50 $CO_2/CH_4$ mixture at 295 K with a feed pressure of 222 kPa and a pressure drop of 138 kPa. The average $CO_2$ permeance was $(2.3+/-0.2) \times 10^{-7}$ mol/(m$^2$ sPa) and the average $CH_4$ permeance was $(3.1+/-0.8) \times 10^{-9}$ mol/(m$^2$ sPa). (Li, S. et al, Ind. Eng. Chem. Res. 2005, 44, 3220-3228). U.S. Patent Application Publication 2005-0204916-A1 to Li et al. reports $CO_2/CH_4$ separation selectivities of 67-93 for a 50/50 $CO_2/CH_4$ mixture at 297 K with a feed pressure of 222 kPa and a pressure drop of 138 kPa.

Several U.S. patents report processes for the manufacture of molecular sieve layers on a support which involve depositing or forming molecular sieve crystals on the support prior to an in situ synthesis step. U.S. Pat. No. 6,090,289 to Verduijn et al. reports a process which involves forming an intermediate layer by applying molecular sieve crystals to the support or forming such crystals on the support then contacting the resulting coated support with a molecular sieve synthesis mixture and subjecting the mixture to hydrothermal treatment in order to deposit an upper layer comprising a crystalline molecular sieve of crystals having at least one dimension greater than the dimensions of the crystals of the intermediate layer. U.S. Pat. No. 6,177,373 to Sterte et al. reports a process which involves depositing on a substrate a monolayer comprising molecular sieve monocrystals which are capable of nucleating the growth of a molecular sieve film, forming a molecular sieve synthesis solution, contacting the monolayer and the synthesis solution and hydrothermally growing molecular sieve to form a molecular sieve film on the substrate. U.S. Pat. No. 5,871,650 to Lai et al. reports a process for preparing a zeolite membrane exhibiting a columnar cross-sectional morphology. U.S. Patent Application Publication 2007/0265484 A1 to Li et al report SAPO-34 membranes fabricated via a seeded synthesis technique. The publication reports $CO_2/CH_4$ selectivities of 94-115 for a 50/50 $CO_2/CH_4$ feed at 295 K with a 222 kPa pressure drop and a permeate pressure of 84 kPa.

There remains a need in the art for improved methods for making SAPO membranes, in particular SAPO membranes with improved separation selectivities and high permeances.

BRIEF SUMMARY OF THE INVENTION

In an embodiment, the invention provides methods for making crystalline silicoaluminophosphate (SAPO) membranes on a porous support, in particular SAPO-34 membranes. Inorganic membranes such as SAPOs can have superior thermal, mechanical and chemical stability, good erosion resistance, and high pressure stability as compared to conventional polymeric membranes.

The methods of the invention are capable of producing supported SAPO-34 membranes with improved $CO_2/CH_4$ selectivities and higher $CO_2$ permeances as compared to separation selectivities previously reported for SAPO-34 membranes. For example, the membranes of the invention can have a $CO_2/CH_4$ selectivity greater than 130 for a 50/50 $CO_2/CH_4$ mixture at 295 K with a feed pressure of 222 kPa and a pressure drop of 138 kPa. In addition, the SAPO-34 membranes of the invention can have $CO_2/CH_4$ separation selectivities greater than 50 for trans-membrane pressure drops in excess of 6 MPa. The separation of $CO_2$ from $CH_4$ is important in natural gas processing because $CO_2$ reduces the energy content of natural gas.

In an embodiment, the methods of the invention are also capable of producing supported SAPO-34 membranes having improved separation indices compared to those previously reported for SAPO-34 membranes. The separation index may be defined as the $CO_2$ permeance×(selectivity−1))×permeate pressure. In an embodiment, the invention provides SAPO membranes having a separation index greater than 5 (for a 50/50 (molar ratio) mixture at 295 K with a feed pressure of 222 kPa and a pressure drop of 138 kPa). Previously an upper bound for polymeric membranes for $CO_2/CH_4$ separation selectivities versus $CO_2$ permeabilities was reported (L. M. Robeson, J. Membr. Sci. 62, 165 (1991)). The values for several SAPO-34 membranes prepared according to the methods of the present invention (labeled "present work") are significantly above the upper bound (FIG. 1a). The direct separation performance comparison of several of the 1 layer membranes of the invention (labeled "present work") vs. the membranes of Li et al. 2006 is shown in FIG. 1b (S. Li, J. L. Falconer, R. D. Noble, Adv. Mater. 18, 2601 (2006)).

In an embodiment, the invention provides a method for making a crystalline silicoaluminophosphate-34 (SAPO-34) membrane, the method comprising the steps of:
 a) providing a porous support having a surface;
 b) applying a first quantity of SAPO-34 crystalline material to at least part of the surface of the porous support prior to step d), wherein the first quantity of crystalline material is in the form of loose SAPO-34 crystals;
 c) preparing an aqueous SAPO-34 forming gel wherein the gel comprises aluminum, phosphorus, silicon, oxygen, a first and a second organic templating agent and water, with the ratio of silicon to aluminum being greater than 0.1;
 d) contacting the porous support with the gel;
 e) heating the porous support and the gel to form a second quantity of SAPO-34 crystalline material on the support, thereby forming a cumulative layer of SAPO-34 crystals on the surface of the support; and
 f) calcining the SAPO-34 layer to remove the templating agents.

In an embodiment, the size distribution of the loose crystals is narrow, having a standard deviation less than or equal to 0.1 micron or less than or equal to about 15% of the characteristic crystal size.

In another embodiment, the invention provides a method for making a crystalline silicoaluminophosphate-34 (SAPO-34) membrane, the method comprising the steps of:
 a) providing a porous support having a surface whose average pore size is from 0.05 microns to 6.0 microns;
 b) applying a first quantity of SAPO-34 crystalline material to at least part of the surface of the porous support prior to step d), wherein prior to its application the first quantity of crystalline material is in the form of loose SAPO-34 crystals, the characteristic size of the crystals being from 0.5 microns to 3.0 microns;
 c) preparing an aqueous SAPO-34 forming gel, wherein the gel comprises aluminum, phosphorus, silicon, oxygen, a first and a second organic templating agent and water, with the ratio of silicon to aluminum being greater than 0.1;
 d) aging the gel for at least twenty four hours at a temperature from 40° C. to 60° C.;
 e) contacting the porous support with the aged gel;
 f) heating the porous support and the gel to form a second quantity of SAPO-34 crystalline material on the support, thereby forming a cumulative layer of SAPO-34 crystals on the surface of the support, wherein the porous support and the gel are heated to a temperature from 453 K to 553 K time for 20 to 25 hours; and
 g) calcining the SAPO-34 layer to remove the templating agents.

The membranes of the invention are made using a technique in which SAPO-34 crystals are applied to the support surface prior to in situ hydrothermal synthesis. In different embodiments, the average size of these crystals is less than or equal to 3 microns, less than or equal to 1 micron, or less than or equal to 0.8 microns. In other embodiments, the average size of the crystals is from 0.5 to 1 micrometer or from 0.5 to 2 micrometers. Use of this technique can allow thinner membranes to be made, thereby increasing the permeance of the membrane. In an embodiment, the invention also provides "seed" crystals and methods for making seed crystals having sizes and shapes useful for the membrane fabrication methods of the invention. These methods can employ a plurality of structure directing agents. In an embodiment, three structure directing agents are used.

The methods of the invention provide supported SAPO membranes. In an embodiment, the invention provides a supported membrane comprising a porous support and SAPO crystals which form a layer on one side of the support. SAPO crystals may also be present within at least some of the pores of the support. In another embodiment, the porous support is in the form of a tube and the SAPO crystals form a layer on either the inside and the outside of the tube. In different embodiments, the thickness of the membrane is less than 2 microns, less than 10 microns, between 1 and 10 microns, or from 1 to 10 microns.

The invention also provides methods for separating a first gas component from a gas mixture including at least a first and a second gas component. In an embodiment, the method comprises the steps of:

a) providing a membrane of the invention, the membrane having a feed and a permeate side and being selectively permeable to the first gas component over the second gas component;
b) applying a feed stream including the first and the second gas components to the feed side of the membrane; and
c) providing a driving force sufficient for permeation of the first gas component through the membrane, thereby producing a permeate stream enriched in the first gas component from the permeate side of the membrane.

In an embodiment, the first gas component is carbon dioxide and the second gas component is methane.

DETAILED DESCRIPTION OF THE INVENTION

Figures 1A, 1B:
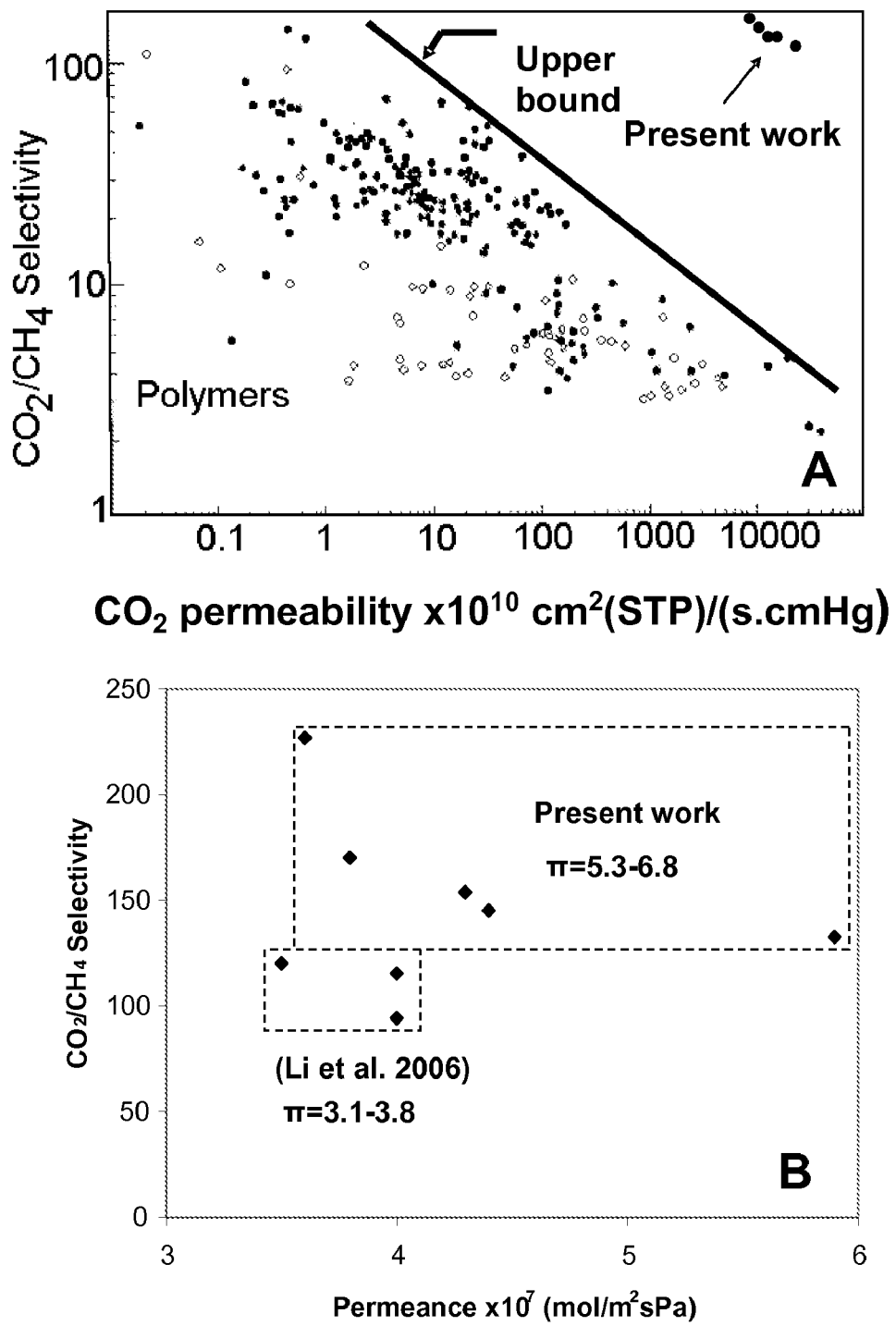
FIG. 1A shows a comparison of $CO_2/CH_4$ separation selectivity versus $CO_2$ permeability for polymeric membranes and several SAPO-34 membranes of the present invention (labeled "present work") at 295 K. Feed and permeate pressures of 222 and 84 kPa respectively for the SAPO-34 membranes.
FIG. 1B shows a comparison of $CO_2/CH_4$ separation selectivity versus $CO_2$ permeance for 2 layer membranes of Li et al. (S. Li, J. L. Falconer, R. D. Noble, *Adv. Mater.* 18, 2601 (2006)) and one layer SAPO-34 membranes of the present invention (labeled "present work") at 295 K. Feed and permeate pressures of 222 and 84 kPa respectively.

In an embodiment, the invention provides methods of making crystalline SAPO membranes. As used herein, a crystalline SAPO membrane comprises a plurality of SAPO crystals. Although the SAPO membranes of invention are formed on a porous support, a separate binding agent is not required to hold the SAPO crystals together.

In an embodiment, the methods of the invention provide silicoaluminophosphate 34 (SAPO-34) membranes formed of SAPO-34 crystals. SAPOs are zeolite-type molecular sieve materials, having a crystal structure of tetrahedra joined together through oxygen atoms to produce an extended network of channels of molecular dimensions. The SAPO crystals have a three-dimensional crystal framework structure of $PO_2^+$, $AlO_2^-$ and $SiO_2$ tetrahedral units, the framework structure defining a structure of regular cages, cavities, and channels. The dimensions of these channels and cavities are generally microporous. As used herein, "microporous" refers to pore diameters less than about 2 nanometers.

Crystalline SAPO-34 has the CHA structure and is an analog of the natural zeolite chabazite. The CHA framework structure contains single eight ring, double six ring, and single four ring secondary building units. SAPO-34 adsorption measurements have determined that n-$C_4H_{10}$ (0.43 nm diameter) can fit the pores, but i-$C_4H_{10}$ (0.5 nm) diameter cannot, thus the pore size is believed to be between 0.43 and 0.5 nm (Lok et al., in Lok. et al. (eds.) Crystalline Silicoalumino Phosphates, US, 1984).

Other SAPOs have different structures and different pore sizes. SAPOs and other molecular sieves can be classified as small, medium, or large-pore molecular sieves based on the size of the largest oxygen rings in the structure. Crystalline SAPO-5 has the AFI structure which contains rings of 12 oxygen atoms, 6 oxygen atoms, and 4 oxygen atoms. SAPO-5 is typically considered a large-pore molecular sieve. In contrast, crystalline SAPO-11 has the AEL structure which contains rings of 10 oxygen atoms, 6 oxygen atoms, and 4 oxygen atoms. SAPO-11 is typically considered a medium-pore molecular sieve. Structures where the largest ring contains 8 or fewer oxygen atoms are typically considered small-pore molecular sieves. Further information regarding SAPO structures is available in Baerlocher, W. M. Meier and D. H. Olson, "Atlas of Zeolite Framework Types", 5th ed., Elsevier: Amsterdam, 2001 and online at http://www.iza-strucures.org/databases.

In an embodiment, the silicoaluminophosphates formed by the methods of the invention have the framework composition $(Si_xAl_yP_z)O_2$ where
x is between about 0.01 and about 0.98,
y is between about 0.01 and about 0.60, and
z is between about 0.01 and about 0.52.

In another embodiment, monovalent Li; divalent Be, Mg, Co, Fe, Mn, and Zn; trivalent B, Ga, and Fe; tetravalent Ge and Ti; pentavalent As, or combinations thereof may be substituted into the SAPO framework structure.

Silicoaluminophosphates exhibit cation exchange properties. The excess negative charge in the lattice may be compensated by protons or by compensating cations located in the cavities of the structural framework. Acid hydrogen forms of SAPOs (e.g. H-SAPO-34) have protons that are loosely attached to their framework structure in lieu of inorganic compensating cations. In an embodiment the SAPO membranes produced by the methods of the invention are H-SAPO-34. Other forms of SAPO-34 include, but are not limited to Na-SAPO-34, Cu-SAPO-34, Li-SAPO-34, K-SAPO-34, Rb-SAPO-34, and Ca-SAPO-34. These may be made through ion-exchange of H-SAPO-34 or by including the appropriate cation in the synthesis gel.

The membranes of the invention are formed through in-situ crystallization of an aqueous silicoaluminophosphate-forming gel. The gel contains an organic templating agent. The term "templating agent" or "template" or "structure directing agent" is a term of art and refers to a species added to the synthesis media to aid in and/or guide the polymerization and/or organization of the building blocks that form the crystal framework. More than one templating agent may be used in to aid in zeolite synthesis; the different templating agents may perform different functions in zeolite synthesis.

Gels for forming SAPO crystals are known to the art, but preferred gel compositions or processing conditions for forming membranes may differ from preferred compositions or conditions for forming loose crystals or granules. The preferred gel composition may vary depending upon the desired crystallization temperature and time.

In an embodiment, the gel comprises at least two templating agents. In an embodiment, the templating agents comprise nitrogen. In an embodiment, one templating agent is a quaternary ammonium compound and a second templating agent is an amine. In an embodiment, the gel includes only two templating agents. In another embodiment, the gel includes three templating agents. In an embodiment, the first templating agent is a quaternary ammonium compound, and the second and third templating agents are amines. A given templating agent may form ionic species in the gel, so that the gel also contains ionic species derived from the templating agent. For example, quaternary ammonium compounds may produce quaternary ammonium cations in the gel.

In an embodiment, the SAPO-34 forming gel used in membrane synthesis is prepared by mixing sources of aluminum, phosphorus, silicon, and oxygen in the presence of a plurality of templating agents and water. In an embodiment, the gel comprises Al, P, Si, 0, at least two templating agents and water. The composition of the mixture may be expressed in terms of the following molar ratios as:

$$Al_2O_3 : aP_2O_5 : bSiO_2 : cR_1 : dR_2 : eH_2O,\qquad \text{Formula 1}$$

where $R_1$ and $R_2$ are both templating agents. If other elements are to be substituted into the structural framework of the SAPO, the gel composition can also include $Li_2O$, BeO, MgO, CoO, FeO, MnO, ZnO, $B_2O_3$, $Ga_2O_3$, $Fe_2O_3$, GeO, $TiO$, $As_2O_5$ or combinations thereof. If compensating cations are to be included in the cavities of the structural framework, the gel composition can also include sources of the compensating cations (for example, NaOH for $Na^+$, LiOH for $Li^+$, KOH for $K^+$, RbOH for $Rb^+$, and CsOH for $Cs^+$).

In an embodiment suitable for crystallization of SAPO-34 at 453K to 533K for 20-24 hours, a is greater than 0.5 and less than 1.5, b is greater than 0.2 and less than 1.0, c is greater than or equal to 1 and less than 2, and d is greater than zero and less than 4.0 and e is greater than 50 and less than 110.

One important gel composition parameter is the ratio of Si to Al. In an embodiment, the ratio of Si to Al is high enough so that $AlPO_5$ is not formed. In different embodiments, the ratio of silicon to aluminum is greater than 0.1, between 0.15 and 0.45, from 0.15-0.45, between 0.15 and 0.3, from 0.15-0.3, between 0.15 and 0.2, from 0.15 to 0.2 and is about 0.15.

In an embodiment, $R_1$ is a quaternary organic ammonium templating agent. In an embodiment, the quaternary ammonium templating agent is selected from the group consisting of tetrapropyl ammonium hydroxide (TPAOH), tetrapropyl ammonium bromide, tetrabutyl ammonium hydroxide, tetrabutyl ammonium bromide, tetraethyl ammonium hydroxide (TEAOH), tetraethyl ammonium bromide, tetraethylammonium chloride (TEACl) or combinations thereof. In another embodiment, the quaternary ammonium templating agent is selected from the group consisting of TPAOH, TEAOH or combinations thereof. In an embodiment, the templating agent is TEAOH. In an embodiment, the value of parameter c in Formula 1 is greater than or equal to 1 and less than or equal to 2. In another embodiment, the value of parameter c in Formula 1 is greater than or equal to 1 and less than or equal to 1.6.

In an embodiment, $R_2$ is an amine, which may be "small amine". As used herein, the term "small amines" means amines and organic amines having a molecular weight (Mn) of less than or equal to 300 and/or equal to or less than 12 carbon atoms. The amine may be a neutral amine. In an embodiment, $R_2$ is a primary, secondary or tertiary amine. In different embodiments, $R_2$ may be an aliphatic or a cyclic amine. In an embodiment, $R_2$ is an alkyl amine such as dipropylamine (DPA) or N,N-dimethylbutylamine (DMBA). In another embodiment, $R_2$ may have both an amine and an alcohol functionality, such as N,N-dimtheylethanolamine (DMEA). $R_2$ may also be morpholine (MOR). In an embodiment, $R_2$ is selected from the group consisting of dipropylamine (DPA) and cyclohexylamine (CHA). In an embodiment, $R_2$ is DPA. In different embodiments, the value of parameter d in Formula 1 is greater than or equal to 1 and less than or equal to 4, between 1.0 and 3.0, from 1.0 to 3.0, between 1.0 and 2.0, or from 1.0 to 2.0. In an embodiment, the initial pH of a gel combining TEAOH with DPA is between about 9 and about 10, the initial pH of a gel combining TEAOH with CHA is between about 8 and about 8.5.

When a combination of amines is used, Formula 1 can be rewritten as $$Al_2O_3 : aP_2O_5 : bSiO_2 : cR_1 : d_1R_2 : d_2R_3 : eH_2O,\qquad \text{Formula 2}$$

In an embodiment, the value of parameter $d_1$ in Formula 2 is between 0.5 and 1.5 and the value of parameter $d_2$ is between 0.5 and 1.5. In an embodiment, $R_2$ and $R_3$ are dipropylamine (DPA) and cyclohexylamine (CHA). In another embodiment, $d_1$ and $d_2$ are both between 0.5 and 1.0. In an embodiment, the initial pH of a gel combining TEAOH with DPA and CHA is between about 8.5 and about 9.0. The values of the other parameters (a, b, c, e) may be as specified for Formula 1.

The amount of water in the synthesis gel is also an important parameter. In an embodiment, the amount of water used in the membrane synthesis gel is significantly greater than that which would typically be used in a gel for synthesis of loose crystals of the same zeolite. In different embodiments, the value of the parameter e in Formula 1 or 2 is greater than 50, between 50 and 110, from 50 to 110, between 60 and 100, from 60-100, between 70 and 90, from 70-90, between 70 and 80, or from 70-80. In an embodiment, the synthesis gel composition is $1.0Al_2O_3:1.0P_2O_5:0.3SiO_2:1.0TEAOH:1.6DPA: xH_2O$, where x is between 70 and 80. In another embodiment, the synthesis gel composition is $1.0Al_2O_3:1.0P_2O_5: 0.32SiO_2:1.0TEAOH:1.6DPA:xH_2O$, where x is from 70 to 80.

In an embodiment, the synthesis gel is prepared by mixing sources of phosphate and alumina with water for several hours before adding the template. The mixture is then stirred before adding the source of silica. In an embodiment, the source of phosphate is phosphoric acid. Suitable phosphate sources also include organic phosphates such as triethyl phosphate, and crystalline or amorphous aluminophosphates. In an embodiment, the source of alumina is an aluminum alkoxide, such as aluminum isopropoxide. Suitable alumina sources also include pseudoboehmite and crystalline or amorphous aluminophosphates (gibbsite, sodium aluminate, aluminum trichloride). In an embodiment, the source of silica is a silica sol. Suitable silica sources also include fumed silica, reactive solid amorphous precipitated silica, silica gel, alkoxides of silicon (silicic acid or alkali metal silicate). In different embodiments, the gel synthesis temperature is between 25 and 75° C. from 25-75° C., between 40 and 60° C., or from 40-60° C. In an embodiment, the silica source is not tetraethyl orthosilicate.

In an embodiment, the gel is aged prior to use. As used herein, an "aged" gel is a gel that is held (not used) for a specific period of time after all the components of the gel are mixed together. In an embodiment, the gel is sealed and stirred during storage to prevent settling and the formation of a solid cake. Without wishing to be bound by any particular theory, it is believed that aging of the gel affects subsequent crystallization of the gel by generating nucleation sites. In general, it is believed that longer aging times lead to formation of more nucleation sites. The preferred aging time will depend upon the aging temperature selected. Preferably, crystal precipitation is not observed during the aging period. In an embodiment, the viscosity of the aged gel is such that the gel is capable of at least partially penetrating the pores of the porous support. In another embodiment, the viscosity of the aged gel is sufficiently viscous that the gel does not completely penetrate the pores of the support. After initial mixing of the components of the synthesis gel in a container, material can settle to the bottom of the container. In an embodiment, the gel is stirred and aged until no settled material is visible at the bottom of the container and the gel appears translucent and substantially uniform to the eye. Generally, the aging temperature is substantially less than the crystallization temperature. In different embodiments, the aging time is at least about twenty-four hours, greater than about twenty-four hours, at least about forty-eight hours, at least about seventy-two hours, at least about 96 hours, between two days and 10 days, from 2-10 days, between about three days and about seven days, from 3 to 7 days, between four days and 28 days, or from 4 to 28 days. In an embodiment, the gel is not aged longer than one month. In different embodiments, the aging temperature is between 25 and 75° C., from 25 to 75° C., between 40 and 60° C., or from 40-60° C.

The same batch of gel may be used for all the crystallization steps, so long as the upper limit of the aging time is not exceeded. Alternately, more than one batch of gel may be prepared and aged, with different batches being used for one or more crystallization step(s). In an embodiment, each crystallization step may use a different batch of gel. The aging time of different batches of gel at the time of use may be the same or may be different.

The gel is brought into contact with at least one surface of the porous support. If the SAPO-34 crystals have been applied to or previously deposited on at least part of the surface of the support, the gel is brought into contact with at least this part of the surface. In an embodiment, the porous support has two sides (e.g. the inside and outside of a tube or the top or bottom of a plate or disk) and the gel is brought into contact with only one side of the support. One side of the support may be masked to limit its contact with the gel. Suitable masking techniques are known to the art. One known masking technique involves covering the surface with a polymer layer, for example covering it with fluoropolymer tape. Another masking technique involves infiltrating the pores of the support with an organic masking agent, such as a polymer or a wax, which can later be removed through thermal treatment. In another embodiment, the porous support may be immersed in the gel so that more than one surface of the porous support contacts the gel. In an embodiment, at least some of the gel penetrates the pores of the support but the pores of the support are not completely filled with gel. In an embodiment, the porous support is brought into contact with a sufficient quantity of gel such that growth of the SAPO membrane is not substantially limited by the amount of gel available.

The porous support is a body capable of supporting the SAPO membrane. The porous support may be of any suitable shape, including disks and tubes. In an embodiment, the porous support is in the form of a tube. In an embodiment, the porous support is a metal or an inorganic material. In an embodiment, the porous support does not appreciably dissolve or form reaction products at the interface when placed in contact with the synthesis gel. Suitable inorganic porous supports include, but are not limited to, α-alumina, glass, titania, zirconia, carbon, silicon carbide, clays or silicate minerals, aerogels, supported aerogels, and supported silica, titania and zirconia. Suitable porous metal supports include, but are not limited to, stainless steel, nickel based alloys (Inconel, Hastalloy), Fecralloy, chromium and titanium. The metal may be in the form of a fibrous mesh (woven or non-woven), a combination of fibrous metal with sintered metal particles, and sintered metal particles. In an embodiment, the metal support is formed of sintered metal particles. In another embodiment, the inorganic porous support is an α-alumina support. In an embodiment, the α-alumina support has a surface layer with smaller pores and a base layer with larger pores. Ceramic supports having different porosity layers are commercially available (for example Membralox ceramic membranes available from Pall Corp.)

In an embodiment, the pore size of the support is relatively uniform throughout the support. In this case, the pore size at the surface of the support can be characterized by the pore size of the support as a whole. In an embodiment, the pore size characteristic of the surface of the support may be taken as the pore size characteristic of the support as a whole.

In an embodiment, the support may have a different pore size at or near the surface on which the membrane is to be formed than the pore size away from the surface. For example, the support may have two well-defined regions, a first layer with a smaller average pore size (on which the membrane is to be formed) and a second layer with a larger average pore size. When the support has regions or layers which differ in pore size, the pore size at the surface can be characterized by pore size of the region or layer nearest the surface on which the membrane is to be formed. In an embodiment, the pore size characteristic of the surface of the support may be taken as the pore size characteristic of the surface layer or region of the support.

In an embodiment, the pore diameter of the support or the surface region of the support is large enough to allow the synthesis gel to penetrate the support. When SAPO-34 crystals are applied to the surface of the support prior to in situ synthesis, the pore size of the support or of its surface region can be smaller than, equal to, or greater than the characteristic size of the particles. In an embodiment, the average characteristic size of the loose SAPO crystals is larger than the average pore size of the support. This limits the extent of penetration of the crystals inside the support. Often, a porous support will have a distribution of pore sizes. In an embodiment, the pore diameter of the support or the surface region of the support is greater than about 0.1 microns. The pore diameter of the support being greater than about 0.1 microns does not require that every single pore in the support is greater than about 0.1 microns, but it does exclude supports having regions where the characteristic pore size is about 0.1 microns (for example, a support having a layer with an 0.1 micron average pore size). The characteristic pore size may be taken as the average, median or largest pore size.

In different embodiments, the pore size of the support or the surface region the support is greater than or equal to about 50 nm, between about 50 nm and about 1.0 microns, from 0.05 to 1.0 microns, from 0.05 to 0.5 microns, between about 0.1 microns and about 6 microns from 0.1 to 6 microns, from 0.1 to 1.0 microns, between about 0.1 microns and about 0.5 microns, from 0.1 to 0.5 microns, between about 0.2 and about 6 microns, between about 0.5 and about 6 microns, between about 1 micron and about 6 microns, between about 2 and about 6 microns, about 0.3 microns, or about 4 microns The characteristic pore size of the support may be assessed by several methods including microscopy techniques and mercury porosimetry. The porous support may be joined to non-porous material which provides a sealing surface for use of the membrane. This nonporous material may also be immersed in or partially covered with synthesis gel during the synthesis process, in which case SAPO crystals may form on the nonporous material as well. In different embodiments, the porosity of the support is from 10-40%, or between 12% and 22%.

In an embodiment, the porous support is cleaned prior to being brought into contact with the synthesis gel. The support may be cleaned by being boiled in purified water. After cleaning with water, the support may then be dried.

In an embodiment, a first quantity of SAPO-34 crystalline material in the form of loose SAPO-34 crystals is applied to at least part of the surface of the porous support prior to bringing the support in contact with the synthesis gel. As used herein, the term "loose crystals" refers to crystals which are largely unagglomerated or interlocking, in contrast to the interlocking crystals formed during in-situ synthesis of the membrane. The crystals are loose prior to their application to the support. In an embodiment, the crystals applied to the support have a narrow size distribution. If the crystals are cubic, the characteristic size of the crystals is the average length or width of the cubes. If the crystals are cuboid (a parallelepiped of which all the faces are rectangular) the characteristic size of the crystals may be considered to be the average of the longest dimension of the crystals, the shortest dimensions of the crystals, or the average of the longest and shortest dimensions. In an embodiment, the characteristic size is considered to be the average of the longest and shortest dimensions. The average size of the longest and shortest dimensions of the crystals may be estimated through measurement of the length and width, respectively, of one face of each crystal. In different embodiments, the standard deviation of the size distribution is less than or equal to 0.5 microns, less than or equal to 0.1 microns, less than or equal to 20% of the average, less than or equal to 15% of the average, or less than or equal to 10% of the average. In an embodiment, the ratio of the average longest dimension to the average shortest dimension of cuboid crystals is less than or equal to 2 or less than or equal to 1.5.

As used herein, the surface of the support can include both non-porous portions and porous portions where the pores of the support open to the surface. In the present invention crystals can be applied to the surface by contacting crystals with the surface or with crystals already associated with the surface. Since the surface has porous and non-porous portions, contacting the crystals with the surface can include contacting crystals with non-porous portions of the surface or lodging crystals wholly or partially within the pores which open to the surface. The crystals may also be applied to the surface by using coupling agents to form covalent linkages between the crystals and the support surface. In an embodiment, the support is treated with a barrier layer to prevent the crystals from preferentially entering the pores of the support as described in U.S. Pat. No. 6,090,289. In another embodiment, no barrier layer is used. When no barrier layer is used and the crystals are small enough so that some of the crystals lodge within the pores of the support, the crystals need not form a continuous or nearly continuous layer over the non-porous portions of the support surface. The average amount of particles applied can be calculated as the weight of crystals applied divided by the approximate surface area over which the particles are applied.

The crystals may be applied in dry form. For example, various types of brushes or other applicators may be used to apply the crystals. The crystals may be rubbed onto the surface of the support. In an embodiment where a stainless steel support is used, sufficient crystals are rubbed onto the surface of the support so that the support appears uniformly white to the eye. The application process may be repeated several times.

The crystals may also be suspended in solution and the solution applied to the support surface. A variety of techniques are known to the art for applying solutions of colloidal particles including, but not limited to, spin-coating, wash-coating, spray-coating, brushing, slip-casting, dip coating, and immersion for longer periods of time than those used in dip coating.

The support surface may also be treated to impart a surface charge suitable for adsorption of SAPO-34 particles in solution. For example, if the SAPO-34 crystals are dispersed in an alkaline aqueous suspension the crystals are expected to have a negative surface charge. Modification of the surface of the support to impart a positive surface charge results in attraction between the particles and the surface. Modification of support surfaces using cationic polymers to enable adsorption of molecular sieve microcrystals is discussed in U.S. Pat. No. 6,177,373 to Sterte et al. Application of this technique to form silicalite-1 seed layers has been reported by Hedlund et al. (Hedlund, J. et al., 2002, Microporous and Mesoporous Materials, 179-189).

A coupling agent can also be used to attach SAPO-34 particles to the support surface. For example, silane coupling agents can be used to form a covalent linkage between the particles and silanol groups on the surface of the support. Use of coupling agents to form more or less complete zeolite microcrystal monolayers is discussed in U.S. Pat. No. 6,177,373 to Sterte et al.

The size of the crystals applied to the support surface can vary. If it is desired that these crystals penetrate the pores of the support, the size of the crystals is selected accordingly. Packing of the crystals into the pores of the support may limit later penetration of the synthesis gel into the support. In different embodiments, average size of the particles is between about 0.25 microns and about 5 microns, from 0.25 microns to 5 microns, between about 0.5 microns and about 3 microns, from 0.5 to 3 microns, between about 0.5 microns and about 2 microns, from 0.5 to 2 microns, between about 0.25 microns and about 1.5 micron microns, from 0.25 microns to 1.5 microns, between about 0.5 microns and about 1 micron, and from 0.5 microns to 1 micron. If it is desired that the crystals form a stable dispersion or solution of discrete particles, colloidal sized crystals are selected. In other embodiments, the size of the crystals applied to the support is between about 50 nm and about 1000 nm, between about 100 nm and about 1000 nm or between about 50 nm and about 500 nm.

For a given crystal structure, the size and morphology of the loose crystals which will be applied to the support surface can be influenced through the selection of the templating agent or agents used in the gel used to synthesize the crystals. For example, as shown in Example 1, use of one or more additional templating agents in combination with a primary templating agent can be used to reduce the average size of the crystals. Example 1 also gives some examples of gel compositions useful for synthesizing loose crystals for use with the present invention. In an embodiment, the composition of the synthesis gel for the seed crystals is described by: $1.0Al_2O_3$: $1.0P_2O_5$:$0.3SiO_2$:$1.0TEAOH$:$0.8DPA$:$0.8CHA$:$52H_2O$.

In an embodiment, the crystals applied to the support surface may be synthesized from a gel having the substantially the same composition as that used to prepare the membranes. However, the calcination temperature used after synthesis may be higher than that used for the membranes.

In another embodiment, the crystals applied to the support surface may be synthesized from a gel having a different composition than that used to prepare the membranes. In an embodiment, the synthesis gel for the loose crystals may include different templating or structure directing agents than the gel for membrane formation. For example, the synthesis gel for the loose crystals may not contain a quaternary ammonium templating agent. In an embodiment, the crystals applied to the support surface have a different size and/or morphology than those that compose the membrane. In an embodiment, both the crystals applied to the support surface and the crystals that compose the membrane have a blocky morphology, but have different average sizes.

Without wishing to be bound by any particular belief, it is believed that at least some of the crystals applied to the support act as crystallization nuclei for the synthesis mixture during hydrothermal treatment. Crystals that act as crystallization nuclei can be referred to as "seed crystals". Therefore, the crystals applied to the support can be referred to generally as seed crystals, even though every single crystal applied to the support need not act as a nucleus for subsequent crystallization. During membrane synthesis, growth of the seed crystals and nucleation of new crystals on the seed crystals can both occur.

After the porous support and the aged gel are brought into contact, the support and gel are heated in a SAPO crystal synthesis step. This synthesis step can lead to formation of SAPO crystalline material on and in the porous support. As used herein, crystalline material includes both newly formed crystals and crystalline material grown on previously formed crystals. If SAPO crystals have been applied to the support prior to the synthesis step, the synthesis step results in the formation of a second quantity of crystalline material which may take the form of new crystals and/or growth of the applied crystals. During each synthesis step a layer of SAPO crystals can be said to form on the surface of the porous support and/or on previously formed SAPO crystals. The layer of SAPO crystals formed during each synthesis step may or may not be continuous. During the synthesis step, crystals may also precipitate from the synthesis gel without being incorporated into the SAPO membrane.

In an embodiment, the synthesis temperature is between about 420K and about 540 K. In different embodiments, the synthesis temperature is between about 453 K and about 553 K, from 453 K to 553 K, between about 470 K and about 515 K, or from 470 K to 515 K. In an embodiment, the crystallization time is between about 15 and about 25 hours. In a different embodiment, the crystallization time is about 20-25 hours. Synthesis typically occurs under autogenous pressure.

In an embodiment, excess synthesis gel is removed from the support and the SAPO crystals after each synthesis step. The excess gel may be removed by washing with water. After washing with water, the support and SAPO crystals may then be dried.

In an embodiment, a single synthesis step may be sufficient. In another embodiment, the synthesis step may be repeated in order to form a greater amount of SAPO crystals. After each synthesis step, the excess synthesis gel is removed and then the porous support is brought into contact with synthesis gel before performing the next synthesis step. In an embodiment, sufficient synthesis steps are performed so that the cumulative layer formed on the support surface by the synthesis steps and any crystal application steps forms a continuous layer. In an embodiment, sufficient synthesis steps are performed that the membrane is impermeable to nitrogen after preparation (but before calcination). A membrane is substantially impermeable to nitrogen if the flux of nitrogen through the membrane is below the detection limit of the measurement apparatus.

In an embodiment, the SAPO membrane is formed by the cumulative layer(s) of SAPO crystals on the support surface(s) and the (interconnected) SAPO crystals formed inside the porous support (if present). In an embodiment, the SAPO crystals inside the support are substantially interconnected. In an embodiment, the interconnected SAPO crystals are connected to the layers of SAPO crystals formed on the support surface.

When SAPO-34 crystals are applied to the support prior to in situ synthesis, fewer synthesis steps may be required to form a good quality membrane than when no SAPO-34 crystals are applied. In an embodiment, only one synthesis step is required. In another embodiment, two synthesis steps are used.

After SAPO crystal synthesis is complete, the SAPO membranes are calcined to substantially remove the organic template material. After calcination, the membrane becomes a semi-permeable barrier between two phases that is capable of restricting the movement of molecules across it in a very specific manner. In different embodiments, the calcination temperature is between about 600 K and about 900K, and between about 623 K and about 773 K. For membranes made using TEAOH or TPAOH (in combination with amines) as a templating agent, the calcining temperature can be between about 623 K and about 673 K. In an embodiment, the calcination time is between about 5 hours and about 25 hours. Longer times may be required at lower temperatures in order to substantially remove the template material. Use of lower calcining temperatures can reduce the formation of calcining-related defects in the membrane. The heating rate during calcination should be slow enough to limit formation of defects such as cracks. In an embodiment, the heating rate is less than about 2.0 K/min. In a different embodiment, the heating rate is about 0.6 K/min. Similarly, the cooling rate must be sufficiently slow to limit membrane defect formation. In an embodiment, the cooling rate is less than about 2.0 K/min. In a different embodiment, the cooling rate is about 0.9 K/min.

In an embodiment, the SAPO membranes of the present invention comprise SAPO crystals which form a layer on at least one side of the porous support. SAPO crystals may also be present within at least some of the pores of the support. In an embodiment, the SAPO crystals do not fill the pores of the support. The thickness of the SAPO layer depends in part on the number of synthesis steps performed. In embodiment where synthesis steps are performed until the membrane is impermeable to nitrogen, the thickness of the cumulative SAPO layer is less than about 20 microns. When the layer thicknesses are measured from cross-sections with scanning electron microscopy, the uncertainty in the thickness measurement is believed to be on the order of +/−10%. In other embodiments, the thickness of the SAPO layer is less than 10 microns, about 5 microns, less than 5 microns, less than 2 microns, or less than 1.5 microns. In an embodiment, immersion of a porous support in the synthesis gel can lead to formation of SAPO crystals within the support as well as on both sides of the support. For example, immersion of a porous tube in the synthesis gel can lead to formation of SAPO crystals within the tube as well as formation of a SAPO layer on the inside and the outside of the tube. In an embodiment, the SAPO crystals may form throughout the thickness of the support. When both sides of the support are immersed and capable of being penetrated by the gel, formation of SAPO crystals throughout the thickness of the support indicates that the synthesis gel has penetrated to the center of the support. However, formation of SAPO crystals throughout the support does not require that SAPO crystals completely fill the pore space of the support. In an embodiment, the zeolite crystals are not preferentially oriented and do not display a columnar structure.

Transport of gases through a zeolite-type membrane can be described by several parameters. As used herein, the flux, $J_i$, through a membrane is the number of moles of a specified component i passing per unit time through a unit of membrane surface area normal to the thickness direction. The permeance or pressure normalized flux, $P_i$, is the flux of component i per unit transmembrane driving force. For a diffusion process, the transmembrane driving force is the gradient in chemical potential for the component (Kärger, J. Ruthven, D. M., Diffusion in Zeolites, John Wiley and Sons: New York, 1992, pp. 9-10). The selectivity of a membrane for components i over j, $S_{i/j}$ is the permeance of component i divided by the permeance of component j. The ideal selectivity is the ratio of the permeances obtained from single gas permeation experiments. The actual selectivity (also called separation selectivity) for a gas mixture may differ from the ideal selectivity.

Transport of gases through zeolite pores can be influenced by several factors. As used herein, "zeolite pores" are pores formed by the crystal framework of a zeolite-type material. A model proposed by Keizer et al. (J. Memb. Sci., 1998, 147, p. 159) has previously been applied to SAPO-34 membranes (Poshusta et al., AIChE Journal, 2000, 46(4), pp 779-789). This model states that both molecular sizes relative to the zeolite pore and the relative adsorption strengths determine the faster permeating species in a binary mixture. This gives rise to three separation regimes where both components are able to diffuse through the molecular sieve pores. In the first region, both molecules have similar adsorption strengths, but one is larger and its diffusion is restricted due to pore walls. In the first region, the membrane is selective for the smaller molecule. In region 2, both molecules have similar kinetic diameters, but one adsorbs more strongly. In region 2, the membrane is selective for the strongly adsorbing molecule. In region 3, the molecules have significantly different diameters and adsorption strengths. The effects of each mechanism may combine to enhance separation or compete to reduce the selectivity.

For $CO_2/CH_4$ separations, the separation index $\pi$, can be defined as the $CO_2$ permeance times the quantity (separation selectivity minus 1) times the permeate pressure. For permeance measured in mol/m$^2$ s Pa, and pressure measured in Pa, the separation index has units mol/m$^2$ s. The separation index can be used as another separation performance parameter. In an embodiment, the invention provides membranes having separation indices greater than 4, greater than or equal to 5, greater than 5, greater than or equal to 6, greater than 6, greater than or equal to 7, or greater than 7. In an embodiment, these separation indices are for feed and permeate pressures of 222 and 84 kPa for a 50/50 $CO_2/CH_4$ mixture at about 295 K.

In an embodiment, the SAPO-34 membranes of the invention have room-temperature $CO_2/CH_4$ separation selectivities greater than about 100 or greater than about 130 for an approximately 50/50 $CO_2/CH_4$ mixture with about 222 kPa feed pressure and about 138 kPa pressure drop at about 295 K.

In industrial gas separation processes, the pressure drop across the membrane can be several MPa. For example, in the natural gas separation industry, the trans-membrane pressure drop is about 6 MPa. Therefore, the membrane separation selectivity for trans-membrane pressure differentials in the MPa range can be very important. In different embodiments, the $CO_2/CH_4$ separation selectivity of the SAPO-34 membranes of the invention is greater than about 20, 30, 40 or 50 at a temperature of about 298K for an approximately 50/50 $CO_2/CH_4$ mixture with about 6 MPa pressure drop. In an embodiment, the separation selectivity of the SAPO-34 membranes of the invention is greater than about 40, 50, 60, 70 or 80 at a temperature of about 295K for an approximately 50/50 $CO_2/CH_4$ mixture with about 1.7 MPa pressure drop In natural gas separation, the methane loss in the permeate should be reduced as low as possible. That is, high $CO_2$ permeate concentration is an important parameter. In different embodiments, the $CO_2$/permeate concentration is greater than about 90%, 95%, or 97% for the SAPO-34 membranes of the invention at a temperature of about 298 K for an approximately 50/50 $CO_2/CH_4$ mixture with about 7 MPa pressure drop.

Transport of gases through a crystalline zeolite-type material such as a SAPO membrane can also be influenced by any "nonzeolite pores" in the membrane structure. "Nonzeolite pores" are pores not formed by the crystal framework. Intercrystalline pores are an example of nonzeolite pores. The contribution of nonzeolite pores to the flux of gas through a zeolite-type membrane depends on the number, size and selectivity of these pores. If the nonzeolite pores are sufficiently large, transport through the membrane can occur through Knudsen diffusion or viscous flow. For some SAPO-34 membranes, membranes with more nonzeolite pores have been shown to have lower $CO_2/CH_4$ selectivities (Poshusta et al., AIChE Journal, 2000, 46(4), pp 779-789). As the pressure drop increases, any transport through viscous flow contributes more to the overall flux and thus can decrease the selectivity of the membrane. Therefore, membranes with fewer nonzeolite pores can have better separation selectivities at higher pressures.

The membranes of the invention can be selectively permeable to some gases over others. For example, the SAPO-34 membranes of the invention are selectively permeable to $CO_2$ over $CH_4$, especially at lower temperatures. Therefore, the invention provides a method for separating two gases in a feed stream including these two gas components using the membranes of the invention. The feed stream is applied to the feed side of the membrane, generating a retentate stream and a permeate stream. In order to separate the two gases, sufficient trans-membrane driving force must be applied that at least one of the gases permeates the membrane. In an embodiment, both gases permeate the membrane. If the membrane is selectively permeable to a first gas component over a second gas component, the permeate stream will be enriched in the first gas component while the retentate stream will be depleted in the first component. The permeate stream being enriched in the first gas component implies that the concentration of the first gas component in the permeate stream is greater than its concentration in the feed stream. Similarly, the retentate stream being depleted in the first gas component implies that the concentration of the first gas component in the retentate stream is less than its concentration in the feed stream.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art.

When a Markush group or other grouping is used herein, all individual members of the group and all combinations and subcombinations possible of the group are intended to be individually included in the disclosure. Whenever a range is given in the specification, for example, a temperature range, a time range, or a composition range, all intermediate ranges and subranges, as well as all individual values included in the ranges given are intended to be included in the disclosure. As used herein, a range between about a first number and about a second number is intended to include the range from the first to the second number.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

In general the terms and phrases used herein have their art-recognized meaning, which can be found by reference to standard texts, journal references and contexts known to those skilled in the art. The preceding definitions are provided to clarify their specific use in the context of the invention.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Those of ordinary skill in the art will appreciate that the SAPO membranes of the invention may be made using starting materials other than those specifically disclosed herein and that procedures and techniques functionally equivalent to those described herein can be employed to make, assess, and use the SAPO membranes described herein.

In the examples, the gel compositions are given in terms of molar proportions. In addition, the 50/50 $CO_2/CH_2$ feed gas composition referred to herein contains equimolar amounts of $CO_2$ and $CH_2$.

EXAMPLES

Example 1

Preparation of SAPO-34 Powder

Powder Synthesis I

In a typical synthesis, $Al(i-C_3H_7O)_3$ (>99.99%, Aldrich), $H_3PO_4$ (85 wt % aqueous solution, Aldrich) and deionized $H_2O$ were stirred for 3 h to form an homogeneous solution, then the silica source (Ludox AS-40 colloidal silica 40 wt % suspension in water or Tetraethyl orthosilicate, 98%, both from Sigma-Aldrich) was added and the resultant solution was stirred for another 3 h. The template(s) was/were added and the solution stirred for 3 to 6 days at 273 K or at 333 K. Tetraethylammonium hydroxide (TEAOH), 35 wt % solution in water (Sigma-Aldrich), dipropylamine (DPA), 99% (Aldrich) and cyclohexylamine (CHA), 99% (Sigma-Aldrich) were used as templates. Single, dual, and ternary template systems were employed to direct the synthesis of SAPO-34 loose crystals. The resultant solution was placed in an autoclave, and treated hydrothermally at 493 K for 24 h. After cooling to room temperature, the crystals were centrifuged at 2700 rpm for 20 min and washed with water. This centrifuging procedure was repeated 3 times. The resultant precipitate was dried overnight and calcined at 823 K for 5 hours. The calcination heating and cooling rates were 1.0 and 10 K/min respectively.

The synthesis molar gel compositions were $1.0Al_2O_3$: $1.0P_2O_5$:$0.3SiO_2$:x TEAOH:y DPA:z CHA:a $H_2O$. For the single template system, x=1.2, a=55; for the dual template system with TEAOH and DPA, x=1.0, y=1.6, a=77; for the dual template system with TEAOH and CHA, x=1.0, z=1.0, a=52; and for the ternary template system, x=1.0, y=0.8, z=0.8, a=52.

Figure 2A:
FIG. 2A is an SEM image of SAPO-34 crystals synthesized employing TEAOH as a structure directing agent and colloidal silica as the silica source.
Figure 2B:
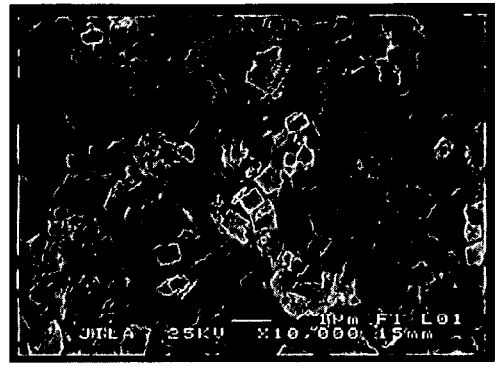
FIG. 2B is an SEM image of SAPO-34 crystals synthesized employing TEAOH-DPA as structure directing agents and colloidal silica as the silica source.
Figure 2C:
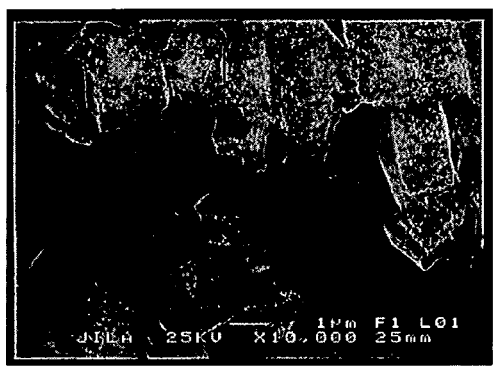
FIG. 2C is an SEM image of SAPO-34 crystals synthesized employing TEAOH-CHA as structure directing agents and colloidal silica as the silica source.
Figure 2D:
FIG. 2D is an SEM image of SAPO-34 crystals synthesized employing TEAOH-DPA-CHA as structure directing agents and colloidal silica as the silica source.
Figure 2E:
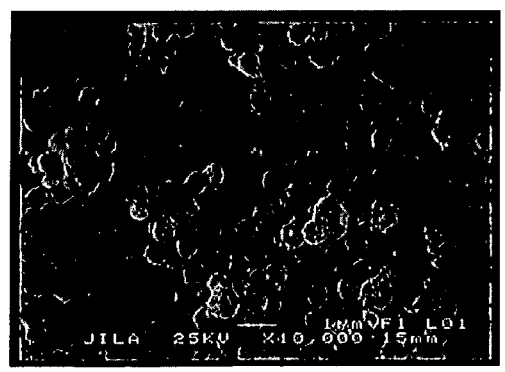
FIG. 2E is an SEM image of SAPO-34 crystals synthesized employing TEAOH as a structure directing agent and TEOS as silica source.

SAPO-34 morphologies and sizes were strongly influenced by the template systems, as shown in FIGS. 2A-2E. Rectangular crystals with average size of ~2.4×3.0 μm were observed for TEAOH template (FIG. 2A). More homogeneous and smaller rectangular crystals, with average size of ~1×1.4 μm, grew when CHA was incorporated as a secondary structure directing agent (SDA) (FIG. 2C). Nearly monodispersed cubic 0.68 μm crystals formed when DPA was used as secondary SDA (FIG. 2B). Sphere-like ~0.51 μm morphologies were observed when TEOS was used as silica source and TEAOH as the template (FIG. 2E). The combination of the three SDAs led to rectangular ~0.6×0.9 μm crystals (FIG. 2D). A JEOL JSM-6400 SEM with an acceleration voltage of 25 kV was used. For the cubic crystals in FIG. 2B, the standard deviation for the size measurement was 0.06 microns. Since the average size was 0.68 microns, this ratio of the standard deviation to the average size was ~9%. For the crystals in FIG. 2D, the standard deviation for the size measurement was 0.08 microns for both dimensions, so the ratio of the standard deviation to the average size was ~13% for 1 dimension (the one that has average size of 0.6 microns) and ~9% for the other dimension (the one that has average size of 0.9 microns).

Figure 2F:
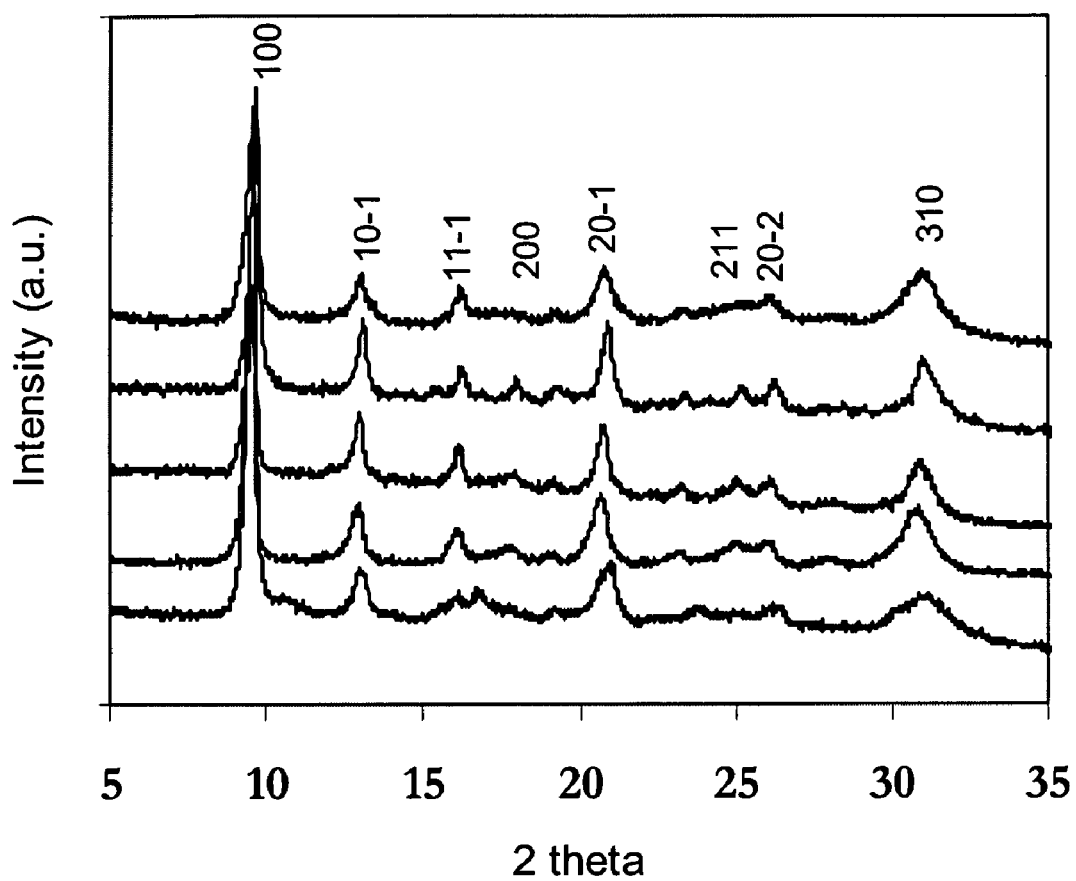
FIG. 2F shows powder X-ray diffraction spectra for the crystals in FIGS. 2A through 2E (bottom through top traces, respectively). The hkl indexes were assigned based on the chabazite structure.
Figure 3A:
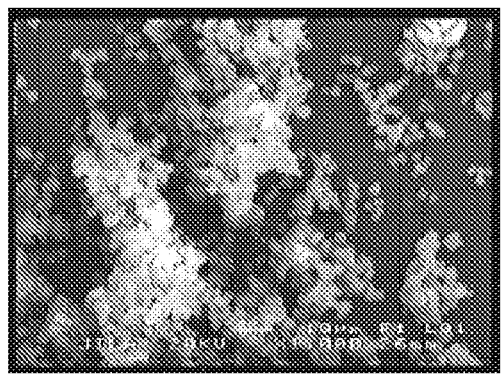
FIG. 3A is an SEM image of SAPO-34 crystals synthesized employing DMBA-DPA as a structure directing agents and colloidal silica as the silica source.
Figure 3B:
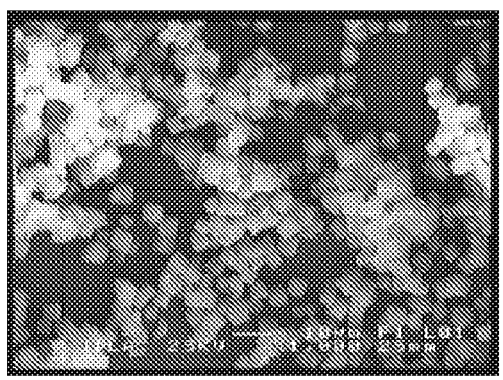
FIG. 3B is an SEM image of SAPO-34 crystals synthesized employing DMBA as a structure directing agent and colloidal silica as the silica source.
Figure 3C:
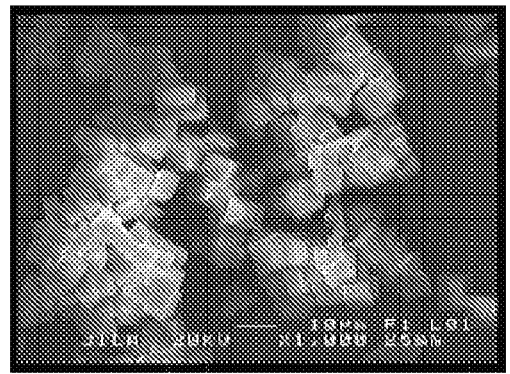
FIG. 3C is an SEM image of SAPO-34 crystals synthesized employing DMEA-TEACl as structure directing agents and colloidal silica as the silica source.
Figure 3D:
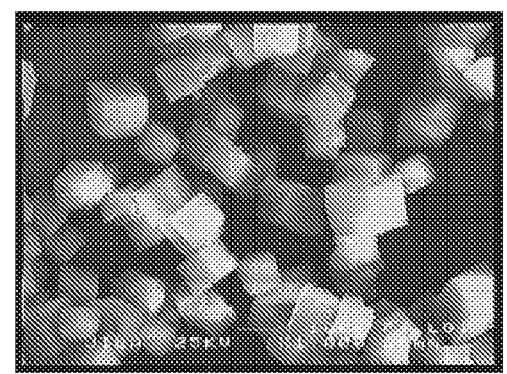
FIG. 3D is an SEM image of SAPO-34 crystals synthesized employing MOR as a structure directing agent and colloidal silica as the silica source.
Figure 4A:
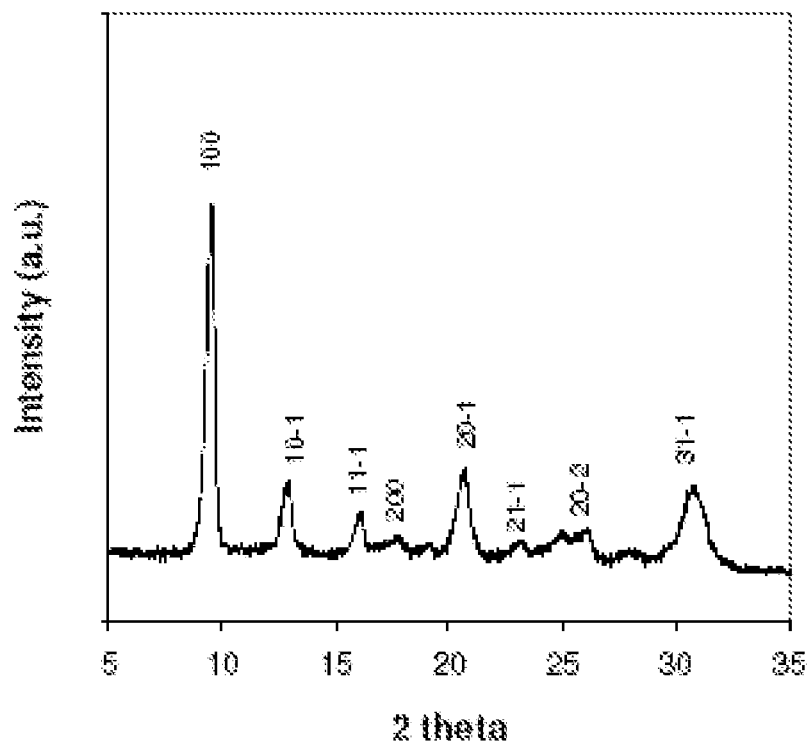
FIG. 4A-4G show x-ray diffraction spectra for crystals synthesized with colloidal silica as the silica source and templates of TEAOH-DPA, TEAOH-DPA-CHA, TEAOH-CHA, DMBA-DPA, DMBA, DMEA-TEACl and MOR, respectively.
Figure 4B:
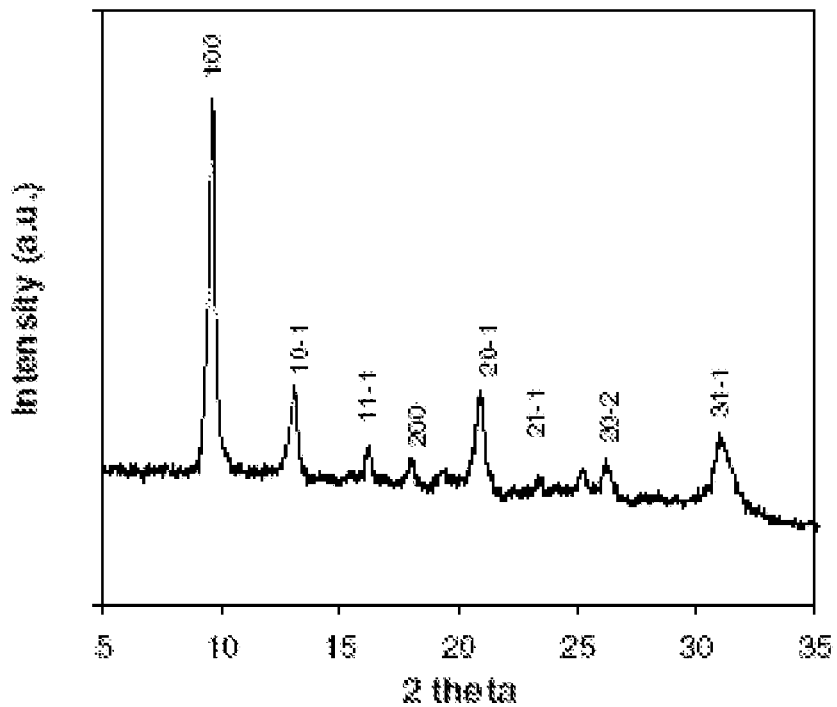
Figure 4C:
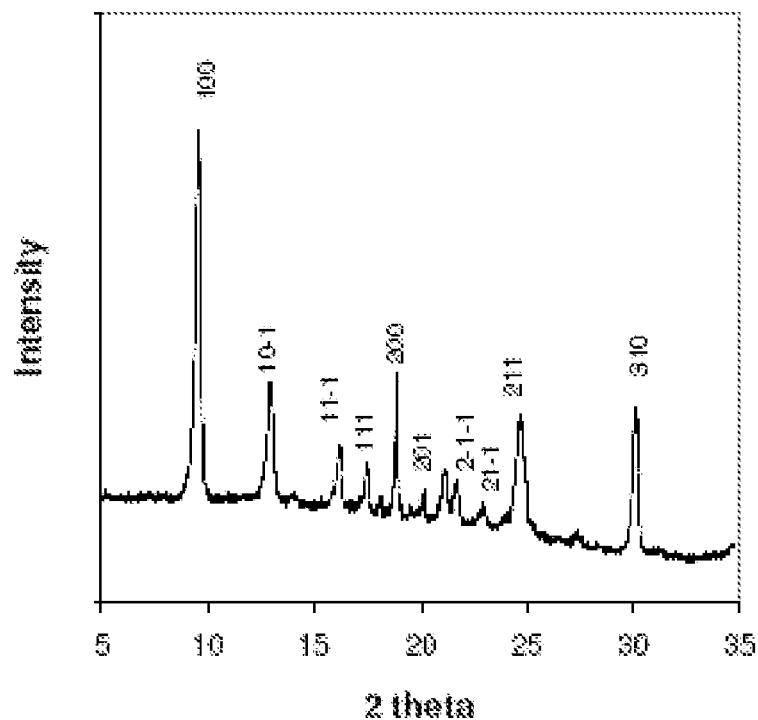
Figure 4D:
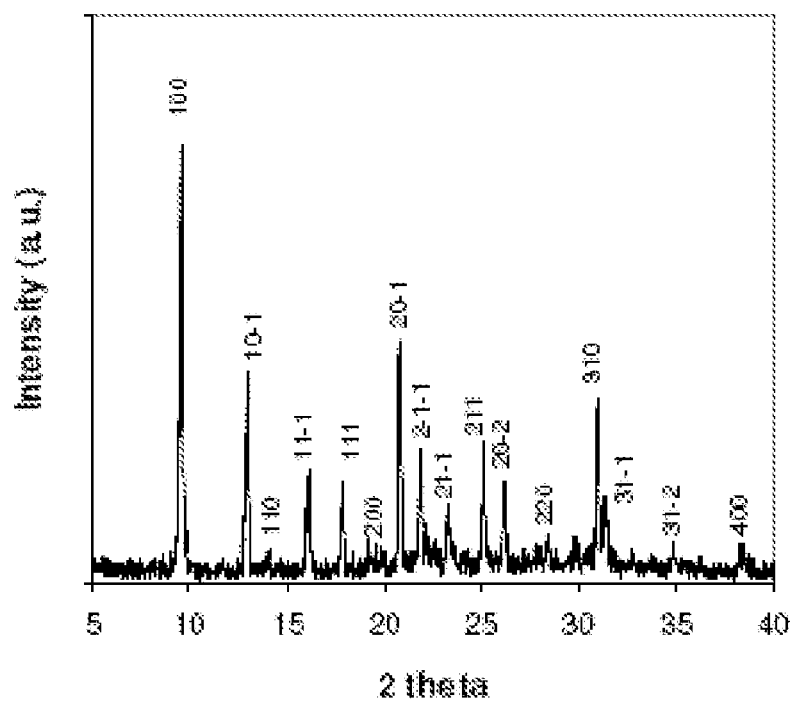
Figure 4E:
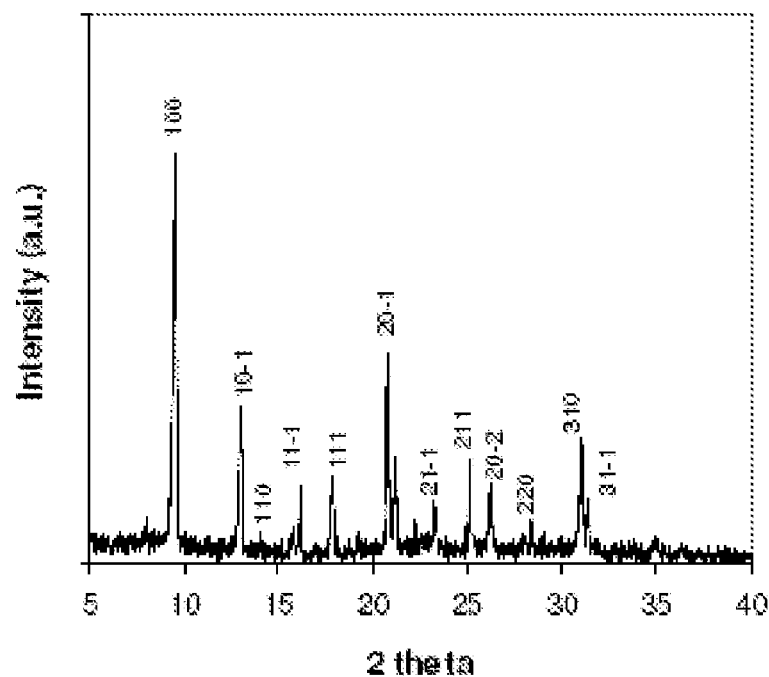
Figure 4F:
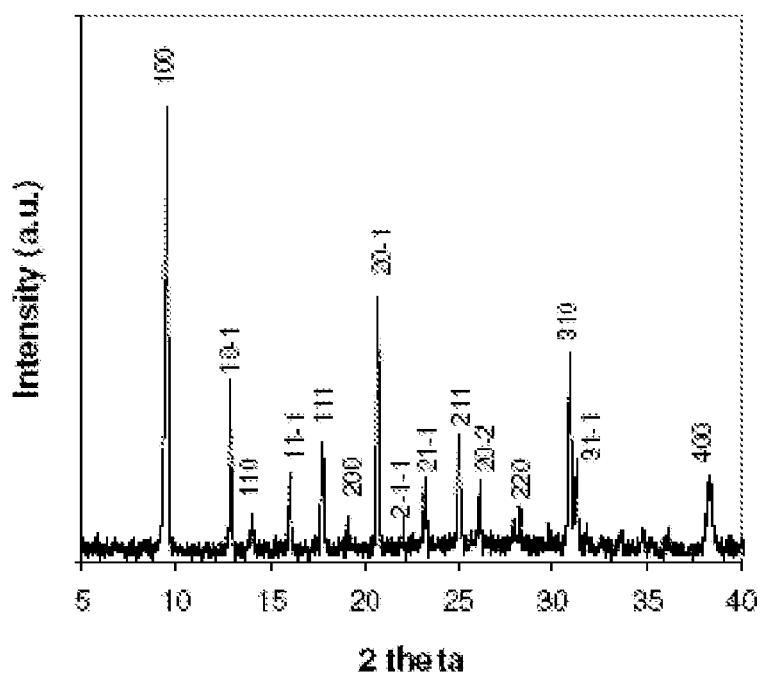
Figure 4G:
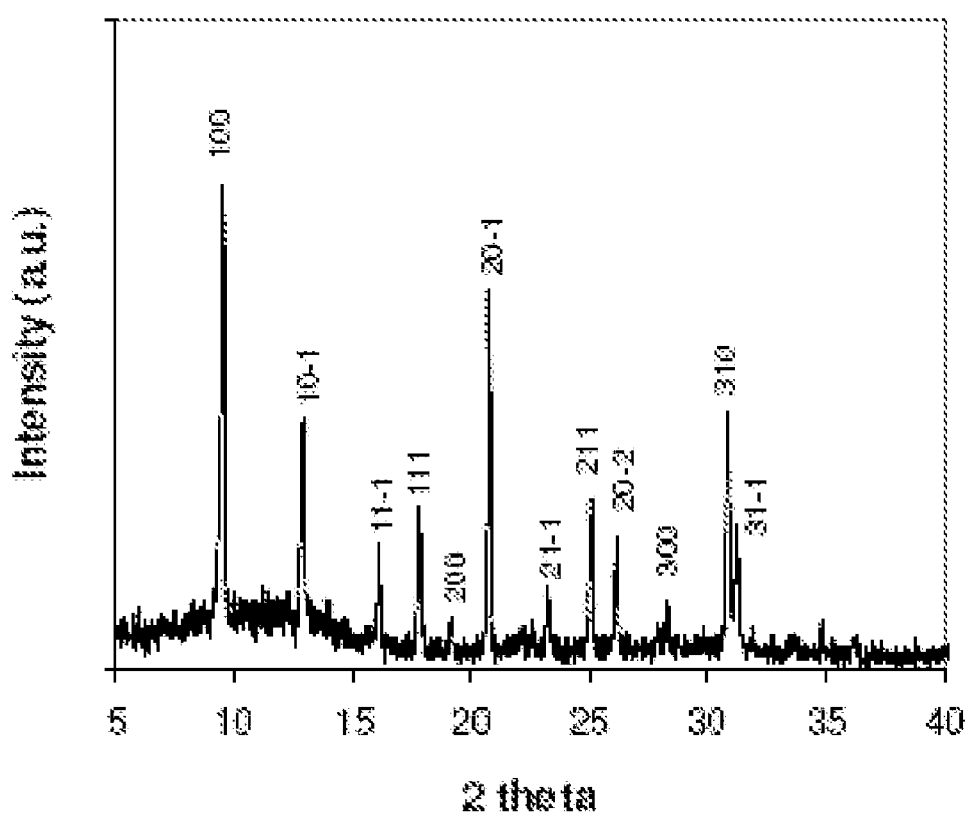

As determined by x-ray diffraction (XRD), all samples were pure SAPO-34 crystals. FIG. 2F shows powder X-ray diffraction spectra for the crystals in FIGS. 2A through 2E (bottom trace to top trace, respectively). The hkl indexes were assigned based on the chabazite structure. Powder XRD patterns were obtained with an Intel CPS 120 diffraction system employing $CuK_\alpha$ radiation. The gel aging temperature for the crystals in FIGS. 2A-2E was 60° C.

Without wishing to be bound by any particular theory, it is believed that TEAOH serves as the pivotal SDA used to nucleate SAPO-34 crystal growth, and DPA and CHA act to provide pore filling and basicity. Incorporating the secondary SDAs increased the pH from 7.5 for the single template system to 8.5-10.0 for the mixed template systems (approximately 8-8-5 for TEAOH-CHA, approximately 9-10 for TEAOH-DPA and approximately 8.5-9 for TEAOH-DPA-CHA). It is believed that the high alkalinity (pH ~10) in the TEAOH-DPA system promoted secondary nucleation that led to the formation of smaller crystals.

Powder Synthesis II

Additional synthesis gel compositions were prepared by a procedure similar to the procedure described above, except that after the templates were added the solution was stirred for 4 days at 318-323 K. Tetraethylammonium hydroxide, 35 wt % solution in water (Sigma-Aldrich), dipropylamine, 99% (Aldrich), and cyclohexylamine, 99% (Sigma-Aldrich), morpholine, >99% (Sigma-Aldrich), N,N-dimethylbutylamine, 99% (Aldrich), N,N-dimethylethanolamine, 99.5% (Aldrich) and tetraethylammonium chloride, >98% (Sigma) were used as templates. The solution was then placed in an autoclave and held at 493 K for 24 h. After the solution was cooled to room temperature, it was centrifuged at 2700 rpm for 20 min to separate the seeds, which were then washed with water. This procedure was repeated three times. The resulting precipitate was dried overnight and calcined at 823 K for 8 h. The calcination heating and cooling rates were 1 and 10 K/min, respectively. The molar ratios for the gel compositions and the resulting seed crystal sizes are given below.

A gel composition of $1.0Al_2O_3:1.0P_2O_5:0.3SiO_2:1.0TEAOH:1.6DPA:77H_2O$ produced a crystal size of 0.7±0.1 microns (silica source=Ludox). A gel composition of $1.0Al_2O_3:1.0P_2O_5:0.3SiO_2:1.0TEAOH:0.8DPA:0.8CHA:77H_2O$ produced a crystal size of 0.8±0.1 microns (silica source=Ludox). A gel composition of $1.0Al_2O_3:1.0P_2O_5:0.3SiO_2:1.0TEAOH:1.6CHA:60H_2O$ produced a crystal size of 1.2±0.2 microns (silica source=Ludox). A gel composition of $1.0Al_2O_3:1.0P_2O_5:0.3SiO_2:2DMBA:1.6DPA:77H_2O$ produced a crystal size of 1.8±0.3 microns (silica source=TEOS, DMBA=N,N-dimethylbutylamine). A gel composition of $1.0Al_2O_3:1.0P_2O_5:0.3SiO_2:3DMBA:77H_2O$ produced a crystal size of 2.5±0.5 microns (silica source=TEOS). A gel composition of $1.0Al_2O_3:1.15P_2O_5:0.2SiO_2:2DMEA:1.0TEACl:77H_2O$ produced a crystal size of 4.0±1.0 microns (silica source=Ludox, DMEA=N,N-dimethylethanolamine). A gel composition of $1.0Al_2O_3:1.0P_2O_5:0.6SiO_2:3MOR:60H_2O$ produced a crystal size of 8.5±1.5 microns (silica source=TEOS, MOR=morpholine). FIGS. 3A through 3D respectively show the SEM images for SAPO-34 seed crystals synthesized with DMBA-DPA, DMBA, DMEA-TEACl, and MOR. FIG. 4A-4G show x-ray diffraction spectra for crystals synthesized with colloidal silica as the silica source and templates of TEAOH-DPA, TEAOH-DPA-CHA, TEAOH-CHA, DMBA-DPA, DMBA, DMEA-TEACl and MOR, respectively. The XRD patterns indicated that all crystals have the chabazite structure of SAPO-34.

Example 2

Preparation of Zeolite Membrane Synthesis Gel

Membrane Synthesis Gel I

The synthesis molar gel compositions were $1.0Al_2O_3:1.0P_2O_5:0.3SiO_2:x\ TEAOH:y\ DPA:z\ CHA:a\ H_2O$. For the single template system (TEAOH), x=1.2, a=55; for the dual template system 1 (TEAOH-DPA), x=1.0, y=1.6, a=77; for the dual template system 2 (TEAOH-CHA), x=1.0, z=1.0, a=52; and for the ternary template system (TEAOH-DPA-CHA), x=1.0, y=0.8, z=0.8, a=52.

The gel was prepared by stirring $H_3PO_4$ (85 wt % aqueous solution), $Al(i-C_3H_7O)_3$ (>99.99%, Aldrich), and $H_2O$ at room temperature for 3 h. Then the template was added, and the mixture was stirred for 30 min before the source of silica was added. The solution was sealed and stirred during storage to prevent settling and the formation of a solid cake. The gel was aged before use. Gels were aged at 25° C. (room temperature), 40° C., and 60° C. Aging times extended up to 28 days.

Membrane Synthesis Gel II

The synthesis gel molar ratio was $1.0Al_2O_3:1.0P_2O_5:0.3SiO_2:1.0TEAOH:x\ DPA:77H_2O$ (where x=1.6 or 3.2). The gels were aged for greater than 24 hours before use.

Example 3

Preparation of SAPO-34 Membranes on Steel Supports with Application of SAPO-34 Crystals to the Support Prior to Thermal Synthesis In one set of experiments, the supports used were porous stainless steel tubes (Mott 0.1 grade, 0.27 micron average pore size) having a length of approximately 50 mm, an inner diameter of approximately 5 mm and an outer diameter of approximately 7 mm. Non-porous, stainless steel tubes were welded onto each end of the stainless steel support to prevent membrane bypass and to provide a sealing surface for o-rings. The combined length of the combined porous and dense tube assembly was approximately 60 mm. The permeate area was approximately 4.4 cm². Total porosity ~17% (±5%). Before synthesis, the tube assembly was boiled in purified water for 3 h and dried at 373 K under vacuum for 30 min.

The particles applied to the support were prepared from a synthesis gel as described in Example 1, Powder Synthesis I.

Two methods were used to apply the SAPO-34 powder to the support. In the first method, the inside surface of the support tube was rubbed with dry SAPO-34 particles (Si/Al=0.15) using an eyelash brush. Typically, the process was repeated five times.

The outside of the tube was wrapped in Teflon tape. The tube was then placed vertically in an autoclave and the autoclave was filled with synthesis gel. The membrane synthesis gel was prepared as described in Example 2, Membrane Synthesis Gel I The hydrothermal treatment was carried out at 493 K for times from 14 to 24 h. One or two synthesis layers were applied (if a second layer was applied, the tube was inverted between layers). After the hydrothermal step, the membrane was washed with deionized water and dried for ~2 h at 338 K. Membranes were impermeable to $N_2$ after preparation but before calcination. The membranes were calcined in air at 673 K for 8 h to remove the template(s). The calcination heating and cooling rates were 0.7 and 0.9 K/min, respectively.

Figures 5A, 5B:
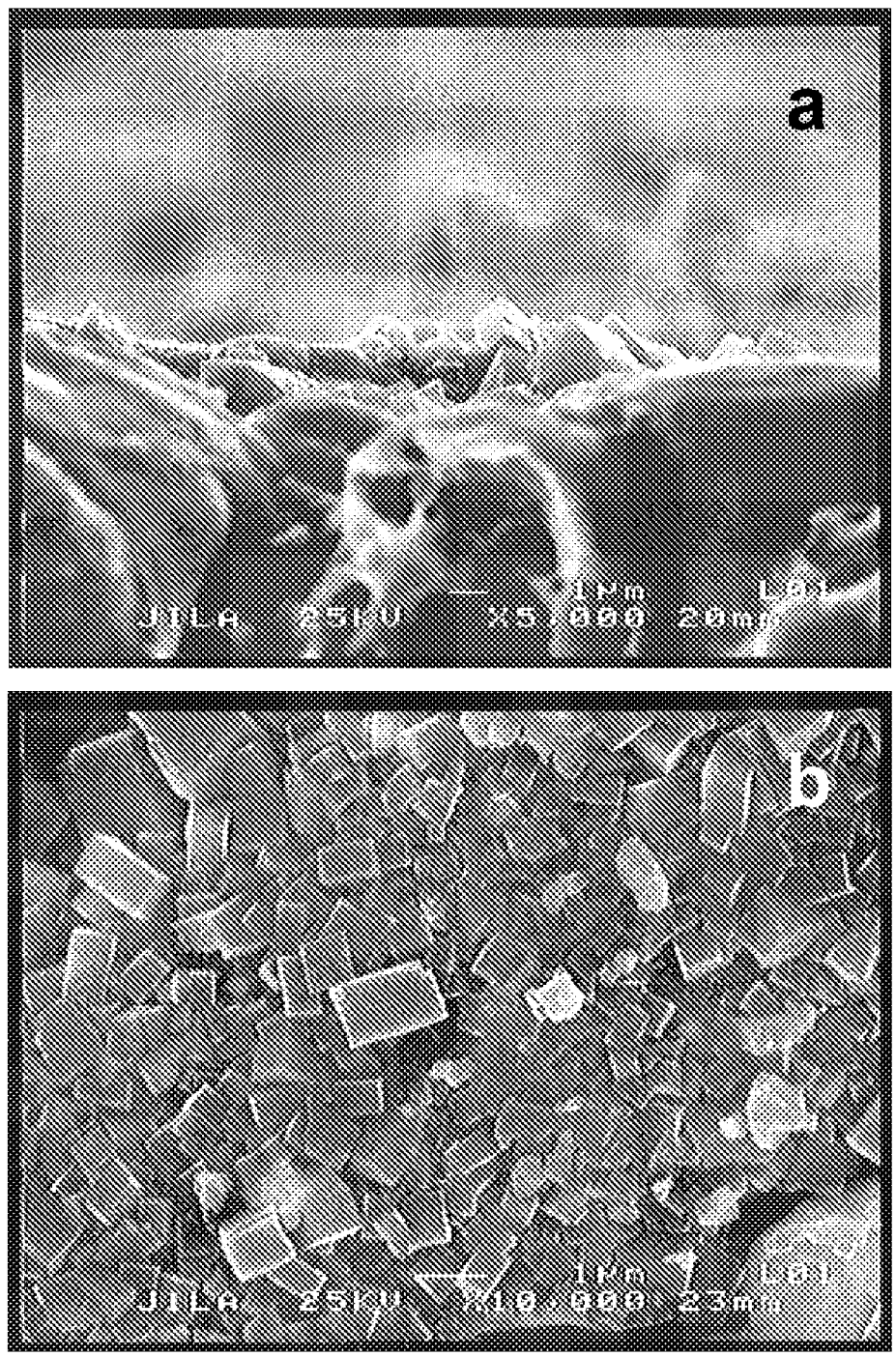
FIG. 5A shows an SEM image of a cross-sectional view of an SAPO-34 membrane on a stainless steel support.
FIG. 5B shows an SEM image of a top view of an SAPO-34 membrane on a stainless steel support.

FIGS. 5a and 5b show SEM images of a SAPO-34 membrane on a stainless steel support: a) cross sectional view and b) top view. The process conditions for this membrane were as follows: one synthesis step, gel aging temperature=60° C., gel aging time 6 days, hydrothermal treatment time=24 h (at 220° C.). The membrane thickness was estimated as approximately 1.2 microns from the cross-sectional view.

Figure 6:
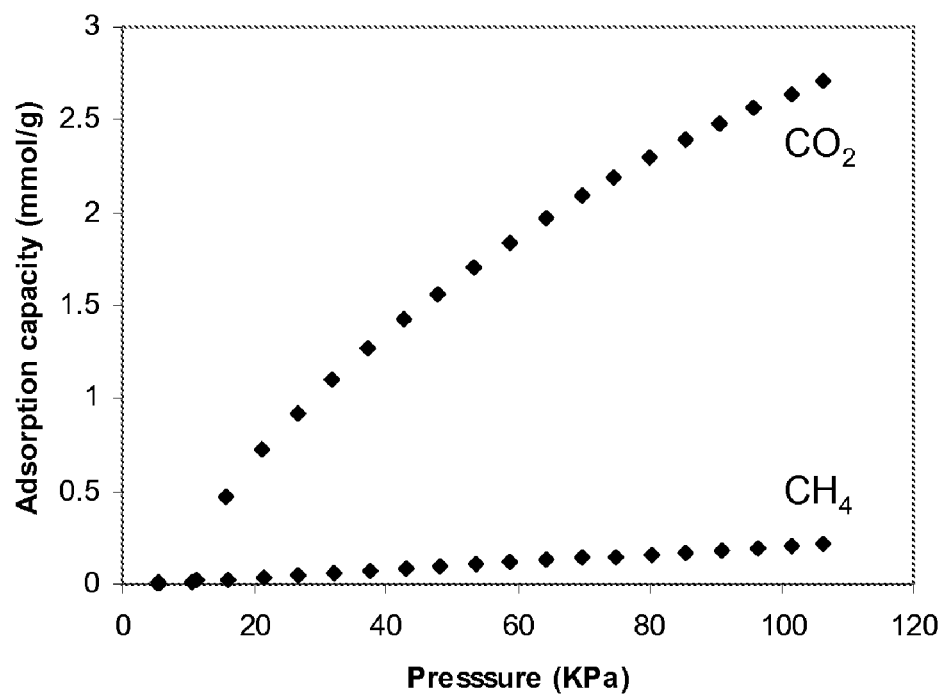
FIG. 6 shows adsorption isotherms for $CO_2$ and $CH_4$ on SAPO-34 powders formed during membrane synthesis.

FIG. 6 shows adsorption isotherms for $CO_2$ and $CH_4$ on SAPO-34 powders collected from the autoclave when membranes were made. These results (Gel molar ratio: $1.0Al_2O_3$: $1.0P_2O_5$:$0.3SiO_2$:1.0TEAOH:1.6DPA:77$H_2O$), indicated that at 106 kPa, the $CO_2/CH_4$ adsorption selectivity was 14, which was higher than the value of 5 obtained for the SAPO-34 crystals synthesized by Li et al. employing a single template system (TEAOH) (S. Li, J. L. Falconer, R. D. Noble, *Adv. Mater.* 18, 2601 (2006)).

In the second application method, the procedure of Ha et al. (K. Ha, Y. J. Lee, H. J. Lee, K. B. Yoon, *Adv. Mater.* 12, 1114 (2000)) was used to attach the crystals to the support. The stainless steel support (covered on the outside with Teflon tape) was placed in a 500-ml, 3-necked round flask, and 120 ml of anhydrous toluene (99.8%, Aldrich) were added together with 3 ml of 3-(chloropropyl)-trimethoxysilane (97+%, Aldrich). The solution was refluxed for ~3 h under continuous argon flow, and then cooled down. The support was washed with toluene and ethanol and dried with argon. The functionalized support was placed in 120 ml of anhydrous toluene that contained 0.18 g of SAPO-34 seeds, and the mixture was refluxed for ~3 h in argon. The support was then sonicated in toluene for ~1 min to remove weakly held zeolite particles. The support was then used to prepare the SAPO-34 membranes.

Membrane C1, where the seed crystals were attached by covalent bonding, underwent a single crystallization step (1-layer membrane) for a hydrothermal treatment time of 23 hours. The molar composition for the seeds was: $1.0Al_2O_3$: $1.0P_2O_5$:$0.3SiO_2$:1.0TEAOH:0.8DPA:0.8CHA:52$H_2O$. The molar composition for the synthesis was: $1.0Al_2O_3$:$1.0P_2O_5$: $0.3SiO_2$:1.0TEAOH:1.6DPA:77$H_2O$. The membrane was calcined in air at 673 K for 8 h to remove the templates.

Example 4

Transport Properties for the 1-Layer SAPO-34 Membranes on Steel Supports

Single-gas and mixture permeation was measured on a system similar to that used by Poshusta et al. (Ind. Eng. Chem. Res., 1998, 37. p. 3924), but modified for the study of light gases at pressure drop as high as 7 MPa. The membranes were mounted in a stainless-steel module, and sealed at each end with silicone O-rings. Fluxes were measured using a soap-film bubble flowmeter and a stopwatch. The lowest measurable permeance was estimated to be $9.6 \times 10^{-11}$ mol/(m$^2$ s Pa).

Carbon dioxide and $CH_4$ single gas and mixture permeation was investigated as a function of temperature and pressure drop for some membranes. For low pressure mixture separations, mass flow controllers were used to mix pure $CO_2$ and $CH_4$ gases. For high-pressure mixture separations, a premixed $CO_2/CH_4$ cylinder gas was used. The total flow rate was 1300 mL/min for most of the experiments. The pressure on each side of the membrane was independently controlled between 84 kPa and 7.2 MPa. To carry out gas separation below room temperature, the membrane module and some system lines were placed into an ethyl glycol/water (50/50) bath. The lowest temperature investigated was about 250 K. The compositions of the feed, retentate, and permeate streams were measured using a Hewlett-Packard 5890/series 11 gas chromatograph equipped with a thermal conductivity detector and HAYESEP-D column (Alltech). The oven, injector, and detector temperatures were all kept at 423 K.

Room Temperature Results

Table 1 shows permeation properties at 295 K for a 50/50 $CO_2/CH_4$ mixture (222 kPa feed pressure and 138 kPa pressure drop) for four single layer membranes (M1-M4) prepared as described in Example 3. Seed crystal synthesis gel molar ratio for ternary system: $1.0Al_2O_3$:$1.0P_2O_5$:$0.3SiO_2$: 1.0TEAOH:0.8DPA:0.8CHA:52$H_2O$. The SAPO-34 powder was rubbed onto the inside surface of the support as described in Example 3. Membrane synthesis gel molar ratio: $1.0Al_2O_3$: $1.0P_2O_5$:$0.3SiO_2$:1.0TEAOH:1.6DPA:77$H_2O$. ICP gel chemical composition: Si/Al=0.1554, P/Al=1.0015; ICP powder chemical composition: Si/Al=0.1319, P/Al=1.0059. The gel synthesis and aging temperature was 60° C., the gel aging time was 4 days, the synthesis temperature was 220° C. and the synthesis time was 24 hours.

As shown in Table 1, $CO_2/CH_4$ selectivities were higher than 130 with $CO_2$ permeances higher than $3.8 \times 10^{-7}$ mol/ (m$^2$·s·Pa) for all membranes. The separation index $\pi$, defined as $CO_2$ permeance×(selectivity−1)*the permeate pressure, was used as a membrane separation performance parameter. Table 1 shows the average separation index was 5.7±0.56 (standard deviation) for four membranes. The values for SAPO-34 membranes M1-M4 are significantly above the upper bound reported by Robeson (FIG. 1a) (L. M. Robeson, J. Membr. Sci. 62, 165 (1991)). Separation indexes were 40-110% higher than recently reported SAPO-34 membranes synthesized employing a single template system (TEAOH) ($\pi$=3.1-3.8) (S. Li, J. L. Falconer, R. D. Noble, *Adv. Mater.* 18, 2601 (2006)) The direct separation performance comparison of the 1 layer membranes prepared in this work vs. the membranes of this reference is shown in FIG. 1b.

TABLE 1

$CO_2/CH_4$ separation properties for One-Layer SAPO 34 membranes on Steel Supports

| Membrane | Permeance (mol/(m²·s·Pa)) | | $CO_2/CH_4$ selectivity | Separation Index ($\pi$) (mol/m²s) |
|---|---|---|---|---|
| | $CO_2 \times 10^7$ | $CH_4 \times 10^9$ | | |
| M1 | 5.9 | 4.5 | 133 | 6.5 |
| M2 | 4.4 | 3.0 | 145 | 5.3 |
| M3 | 3.8 | 2.2 | 170 | 5.4 |
| M4 | 4.3 | 2.8 | 154 | 5.5 |

Figure 7:
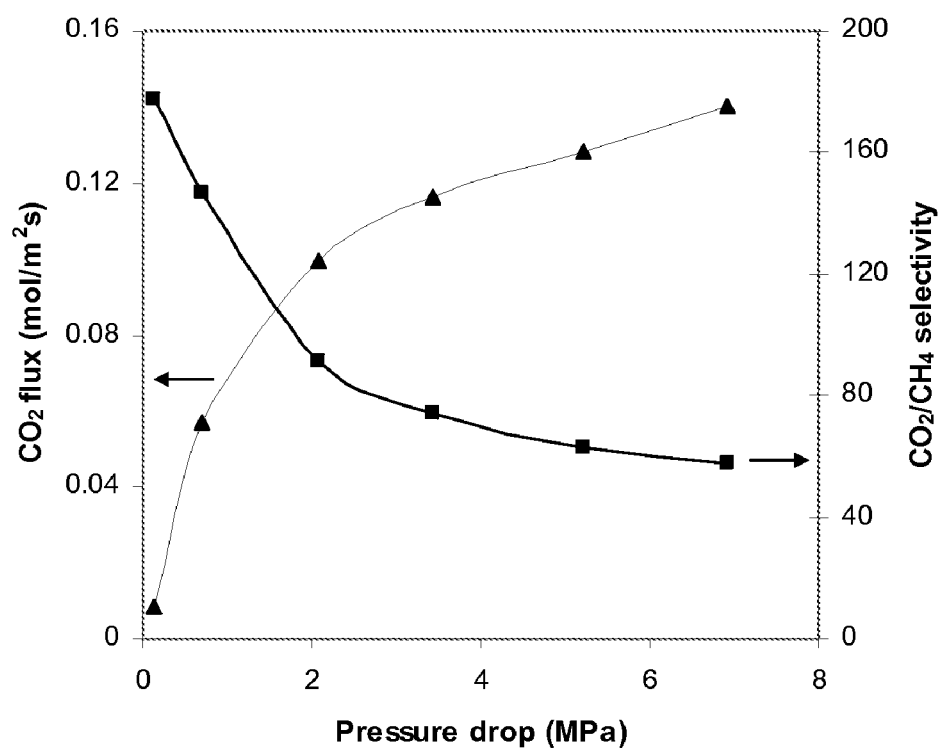
FIG. 7 shows $CO_2$ flux and $CO_2/CH_4$ selectivity for a $CO_2/CH_4$ mixture (50/50) at 295 K as a function of pressure drop for SAPO-34 membrane M16 of Example 4. The permeate pressure was 84 kPa.

FIG. 7 shows $CO_2$ flux and $CO_2/CH_4$ separation selectivity for $CO_2/CH_4$ mixture (50/50) at 295 K as a function of pressure drop for SAPO-34 membrane M16. The permeate pressure was 84 kPa. The separation selectivity decreased as the pressure drop increased; at a pressure drop of 7 MPa a selectivity of greater than 50 was obtained.

Figure 8:
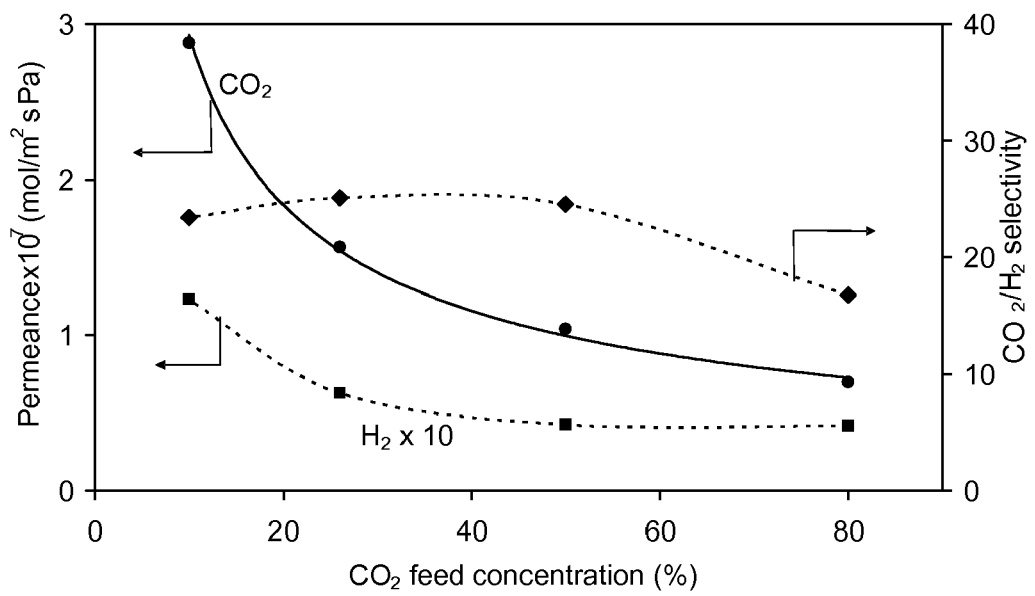
FIG. 8 shows permeances and $CO_2/H_2$ selectivity as a function of $CO_2$ concentration for SAPO-34 membrane M3 of Example 4.

FIG. 8 shows permeances and $CO_2/H_2$ selectivities as a function of $CO_2$ concentration for SAPO-34 membrane M3. The permeate pressure was 84 kPa and the pressure drop was 0.77 MPa.

Another membrane (C1) was prepared by attaching the SAPO-34 powder to the support using the method of Ha et al. (K. Ha, Y. J. Lee, H. J. Lee, K. B. Yoon, *Adv. Mater.* 12, 1114 (2000)). The $CO_2/CH_4$ separation selectivity was 227 and the $CO_2$ permeance was $3.6 \times 10^{-7}$ mol/m² sPa at 295 K for a feed pressure of 224 kPa and a pressure differential of 140 kPa.

Tables 2-8 show the effect of variation of different synthesis parameters on the transport properties of one-layer membranes. For all the membranes shown in Tables 2-7, the molar ratio of the synthesis gel of loose crystals applied to the support prior to in-situ synthesis was: $1.0Al_2O_3:1.0P_2O_5:0.3SiO_2:1.0TEAOH:0.8DPA:0.8CHA:52H_2O$. Except as noted, the gel synthesis and aging temperatures were 60° C., the gel aging time was 4 days, the synthesis temperature was 220° C. and the synthesis time was 24 hours.

Table 2 illustrates the effect of $H_2O$ content on $CO_2/CH_4$ separation performance. For Table 2, the gel molar ratio was: $1.0Al_2O_3:1.0P_2O_5:0.3SiO_2:1.0TEAOH:1.6DPA:x\ H_2O$. In Table 2, the highest $CO_2$ permeance, $CO_2/CH_4$ selectivity, and separation index was obtained for membrane M6.

TABLE 2

| Membrane | $H_2O$ mol (x) | $CO_2$ Permeance $\times 10^7$ (mol/(m²·s·Pa)) | $CO_2/CH_4$ selectivity | Separation Index ($\pi$) (mol/m²s) |
|---|---|---|---|---|
| M5 | 52 | 4.3 | 26 | 0.9 |
| M6 | 77 | 5.9 | 133 | 6.5 |
| M7 | 102 | 3.8 | 78 | 2.5 |

Table 3 illustrates the effect of $SiO_2/Al_2O_3$ content on $CO_2/CH_4$ separation performance. Gel molar ratio: $x\ Al_2O_3:1.0P_2O_5:y\ SiO_2:1.0TEAOH:1.6DPA:77H_2O$. When y/x is equal or lower than 0.2, AlPO-5 appears as impurity, therefore the membrane is not pure SAPO-34 anymore. In Table 3, the highest $CO_2$ permeance, $CO_2/CH_4$ selectivity, and separation index was obtained for membrane M8.

TABLE 3

| Membrane | $SiO_2/Al_2O_3$ (y/x) | $CO_2$ Permeance $\times 10^7$ (mol/(m²·s·Pa)) | $CO_2/CH_4$ selectivity | Separation Index ($\pi$) (mol/m²s) |
|---|---|---|---|---|
| M8 | 0.3 | 5.9 | 133 | 6.5 |
| M9 | 0.4 | 2.2 | 77 | 1.4 |
| M10 | 0.6 | 1.2 | 123 | 1.2 |
| M11 | 0.9 | 0.7 | 68 | 0.4 |

Table 4 illustrates the effect of gel synthesis temperature on $CO_2/CH_4$ separation performance. Gel molar ratio: $1.0Al_2O_3:1.0P_2O_5:0.3SiO_2:1.0TEAOH:1.6DPA:77H_2O$. In Table 4, the highest $CO_2$ permeance and separation index was obtained for membrane M14.

TABLE 4

| Membrane | Gel temperature (° C.) | $CO_2$ Permeance $\times 10^7$ (mol/(m²·s·Pa)) | $CO_2/CH_4$ selectivity | Separation Index ($\pi$) (mol/m²s) |
|---|---|---|---|---|
| M12 | 25 | 4.2 | 112 | 3.9 |
| M13 | 40 | 4.3 | 154 | 5.5 |
| M14 | 60 | 5.9 | 133 | 6.5 |

Table 5 illustrates the effect of hydrothermal treatment time on $CO_2/CH_4$ separation performance. Gel molar ratio: $1.0Al_2O_3:1.0P_2O:0.3SiO_2:1.0TEAOH:1.6DPA:77H_2O$. In Table 5, the highest $CO_2$ permeance and separation index was obtained for membrane M15.

TABLE 5

| Membrane | Hydrothermal treatment time (h) | $CO_2$ Permeance $\times 10^7$ (mol/(m²·s·Pa)) | $CO_2/CH_4$ selectivity | Separation Index ($\pi$) (mol/m²s) |
|---|---|---|---|---|
| M15 | 24 | 5.9 | 133 | 6.5 |
| M16 | 20 | 3.9 | 178 | 5.8 |
| M17 | 17 | 5.7 | 82 | 3.9 |
| M18 | 14 | 6.1 | 55 | 2.8 |

Table 6 illustrates the effect of gel aging time on $CO_2/CH_4$ separation performance. Gel molar ratio: $1.0Al_2O_3:1.0P_2O:0.3SiO_2:1.0TEAOH:1.6DPA:77H_2O$. Gel aging temperature 60° C. In Table 6, the highest separation index was obtained for membrane M20.

TABLE 6

| Membrane | Gel aging time (days) | $CO_2$ Permeance $\times 10^7$ (mol/(m²·s·Pa)) | $CO_2/CH_4$ selectivity | Separation Index ($\pi$) (mol/m²s) |
|---|---|---|---|---|
| M19 | 4 | 4.4 | 145 | 5.3 |
| M20 | 6 | 5.9 | 133 | 6.5 |
| M21 | 14 | 4.3 | 154 | 5.5 |
| M22 | 28 | 6.9 | 88 | 5.0 |

Table 7 illustrates the effect of DPA concentration in the membrane synthesis gel on $CO_2/CH_4$ separation performance. Gel molar ratio: $1.0Al_2O_3:1.0P_2O_5:0.3SiO_2:1.0TEAOH:x\ DPA:77H_2O$. In Table 7, the highest $CO_2$ permeance, $CO_2/CH_4$ selectivity, and separation index was obtained for membrane M24.

TABLE 7

| Membrane | DPA mol (x) | $CO_2$ Permeance × $10^7$ (mol/($m^2 \cdot s \cdot Pa$)) | $CO_2/CH_4$ selectivity | Separation Index ($\pi$) (mol/$m^2$ s) |
|---|---|---|---|---|
| M23 | 3.2 | 1.2 | 118 | 1.2 |
| M24 | 1.6 | 5.9 | 133 | 6.5 |

Table 8 illustrates the effect of different seed crystal morphologies on the $CO_2/CH_4$ separation properties. Different seed crystal morphologies were created by using different combinations of templating agents and silica sources in the seed crystal synthesis gel. The different combinations were TEAOH template with TEOS silica source (single-T), TEAOH template with colloidal silica source (Single-L), TEAOH+CHA template with colloidal silica source (Dual-CHA), TEAOH+DPA template with colloidal silica source (Dual-DPA). The seed crystals were prepared as described in Example 1, Powder Synthesis I. Membrane synthesis gel molar ratio: $1.0Al_2O_3:1.0P_2O_5:0.3SiO_2:1.0TEAOH:1.6DPA:77H_2O$.

TABLE 8

| Membrane | Templates for seeds | $CO_2$ × $10^7$ | $CH_4$ × $10^9$ | $CO_2/CH_4$ selectivity | Separation Index ($\pi$) * (Mol/$m^2$ s) |
|---|---|---|---|---|---|
| S10 | Single-T | 4.2 | 18.1 | 23 | 0.78 |
| S11 | Single-L | 2.5 | 2.3 | 110 | 2.3 |
| S12 | Dual-CHA | 2.2 | 2.4 | 92 | 1.7 |
| S13 | Dual-DPA | 3.7 | 2.9 | 129 | 3.9 |

Example 5

Transport Properties for the SAPO-34 Membranes with 2 Synthesis Steps on Steel Supports Tables 9 and 10 show transport properties for two-layer membranes prepared with a variety of seed crystal morphologies and membrane synthesis gel compositions. Table 9 illustrates $CO_2/CH_4$ separation properties for membranes for which the seed synthesis gel and membrane synthesis gel had the same composition. Table 10 illustrates $CO_2/CH_4$ separation properties for membranes for which the seed synthesis gel and membrane synthesis gel had different compositions. Different seed crystal morphologies were created by using different combinations of templating agents and silica sources in the seed crystal synthesis gel. The different combinations were TEAOH template with TEOS silica source (single-T), TEAOH template with colloidal silica source (Single-L), TEAOH+CHA template with colloidal silica source (Dual-CHA), TEAOH+DPA template with colloidal silica source (Dual-DPA), TEAOH+DPA+CHA template with colloidal silica source (ternary). The gel compositions are given in Example 2, Method I. The seed crystals were prepared as described in Example 1, Powder Synthesis I. The membranes were prepared as described in Example 3, with the aging time for the first layer being 4 days and the aging time for the second layer being 5 days.

TABLE 9

| Membrane | Templates for seeds and gel | $CO_2$ × $10^7$ | $CH_4$ × $10^9$ | $CO_2/CH_4$ Selectivity | Separation Index ($\pi$) * (Mol/$m^2$ s) |
|---|---|---|---|---|---|
| S1 | Single-L | 1.1 | 17.1 | 7 | 0.06 |
| S2 | Single-T | 2.0 | 15.5 | 13 | 0.20 |
| S3 | Dual-CHA | 1.6 | 42.1 | 4 | 0.04 |
| S4 | Dual-DPA | 2.8 | 7.2 | 39 | 0.90 |
| S5 | Ternary | 2.1 | 13.9 | 15 | 0.25 |

TABLE 10

| Membrane (Templates for seeds) | Templates for gel | $CO_2$ × $10^7$ | $CH_4$ × $10^9$ | $CO_2/CH_4$ Selectivity | Separation Index ($\pi$) (Mol/$m^2$ s) |
|---|---|---|---|---|---|
| S6 (Single-T) | Single-L | 2.6 | 2.5 | 102 | 2.2 |
| S7 (Dual-DPA) | Dual-CHA | 2.1 | 1.7 | 121 | 2.1 |
| S8 (Ternary) | Dual-DPA | 2.6 | 2.8 | 91 | 1.9 |
| S9 (Ternary) | Dual-DPA | 3.4 | 4.2 | 82 | 2.3 |

Example 6

Formation of SAPO-34 Membranes on Alumina Supports

The supports used were $\alpha$-$Al_2O_3$ supports (0.2 µm nominal pore size, US Filter Corp.). The $\alpha$-$Al_2O_3$ support was composed of two well-defined regions, an outer ~40 µm thick layer with 0.2 µm average pore size, and a porous base layer with 0.8 µm average pore size. The 0.2 µm layer is believed to provide a smoother surface than the surface stainless steel supports of Example 3. A smoother surface may allow more uniform intergrowth between the zeolite crystals at the support interface and formation of zeolite membranes with higher structural quality. The 0.8 µm average pore size region (~35% porosity as compared to only ~17% porosity on stainless steel supports) allows higher gas throughput rates increasing considerably the $CO_2$ permeance. Prior to membrane preparation, about 1 cm on each end of the ceramic supports was glazed (Duncan IN 1001 envison glaze, Duncan ceramics) to prevent membrane bypass and to provide a sealing surface for O-rings. The permeate area for the ceramic supports was approximately 5.3 $cm^2$.

Figure 9:
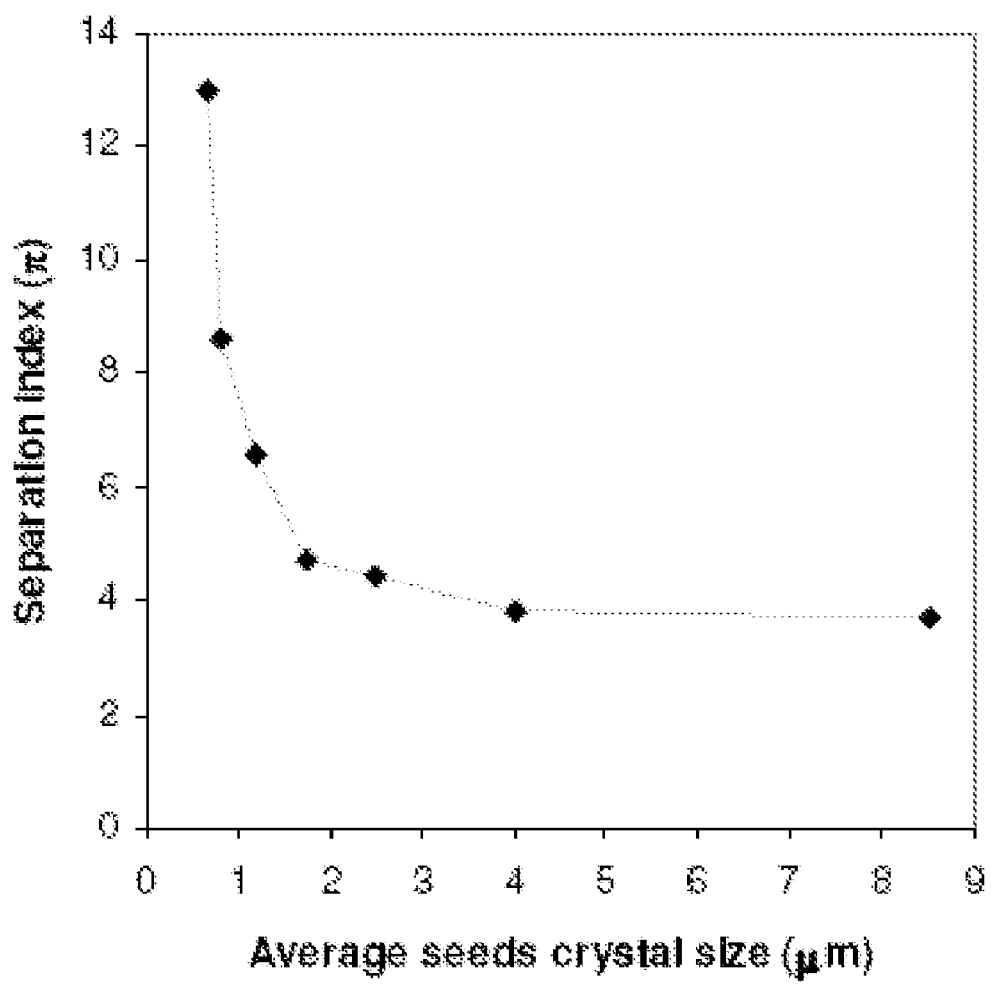
FIG. 9 shows the separation index [($CO_2$ permeance×(selectivity−1))×Permeate pressure] as a function of average SAPO-34 seed crystal size for SAPO-34 membranes prepared on an $\alpha$-$Al_2O_3$ support.

In one set of experiments, the membranes were prepared by rubbing the inside surface of a porous $\alpha$-$Al_2O_3$ supports with dry, calcined SAPO-34 seeds prepared as described in Example 1, Powder Synthesis II. FIG. 9 shows the $CO_2/CH_4$ separation performance of SAPO-34 membranes as a function of average size of the seed crystals. Seeds less than 1 µm produced membranes with superior separation performance. Without wishing to be bound by any particular theory, it is believed that smaller seeds with a narrow size distribution have the potential to close pack more homogeneously than larger crystals, so that the intercrystalline regions that need to intergrow are smaller and thinner membranes can be prepared.

The seed crystal gel compositions for various membranes is shown in Table 11. In Table 11, the seed crystal gels had a common molar compositions of $1.0 Al_2O_3:1.0P_2O_5:0.3SiO_2:1.0TEAOH$. The gels also contained varying amounts of DPA, CHA and water.

TABLE 11

| Membrane | Seed composition 1.0 $Al_2O_3$:1.0 $P_2O_5$:0.3 $SiO_2$:1.0 TEAOH plus | Gel composition 1.0 $Al_2O_3$:1.0 $P_2O_5$:0.3 $SiO_2$:1.0 TEAOH plus | Number of layers |
|---|---|---|---|
| A1 | 0.8 DPA:0.8 CHA:52 $H_2O$ | 1.6 DPA:77 $H_2O$ | 1 |
| A2 | 0.8 DPA:0.8 CHA:52 $H_2O$ | 1.6 DPA:77 $H_2O$ | 1 |
| A3 | 1.6 DPA:77 $H_2O$ | 1.6 DPA:77 $H_2O$ | 1 |
| A4 | 1.6 DPA:77 $H_2O$ | 3.2 DPA:77 $H_2O$ | 1 |
| A5 | 1.6 DPA:77 $H_2O$ | 1.6 DPA:77 $H_2O$ | 2 |

The rubbed porous supports, with their outside wrapped with Teflon tape, were then placed in an autoclave and filled with synthesis gel. The synthesis gel molar ratio was $1.0Al_2O_3$:$1.0P_2O_5$:$0.3SiO_2$:$1.0TEAOH$:x DPA:77$H_2O$ (where x=1.6 or 3.2). The membrane synthesis gel compositions for various membranes are shown in Table 11. The chemical compositions measured by ICP were similar to the synthesis gel composition (Si/Al=0.15, P/Al=1.0). For membranes prepared with a DPA/TEAOH ratio of 1.6, the ICP composition was Si/Al=0.17 and P/Al=1.07. For the membrane prepared with a DPA/TEAOH ratio of 3.2, the ICP composition was Si/Al=0.170, and P/Al=1.04. For membranes A1 and A5, the gel aging temperature was 60° C. and the gel aging time 6 days.

The hydrothermal treatment was carried out at 493 K for 24 h. One or two synthesis layers were applied. After the hydrothermal step, the membranes were washed with deionized water and dried for ~2 h at 338 K. The membranes were calcined in air at 673 K for 8 h to remove the template(s). The calcination heating and cooling rates were 0.7 and 0.9 K/min, respectively.

Figures 10A, 10B, 10C:
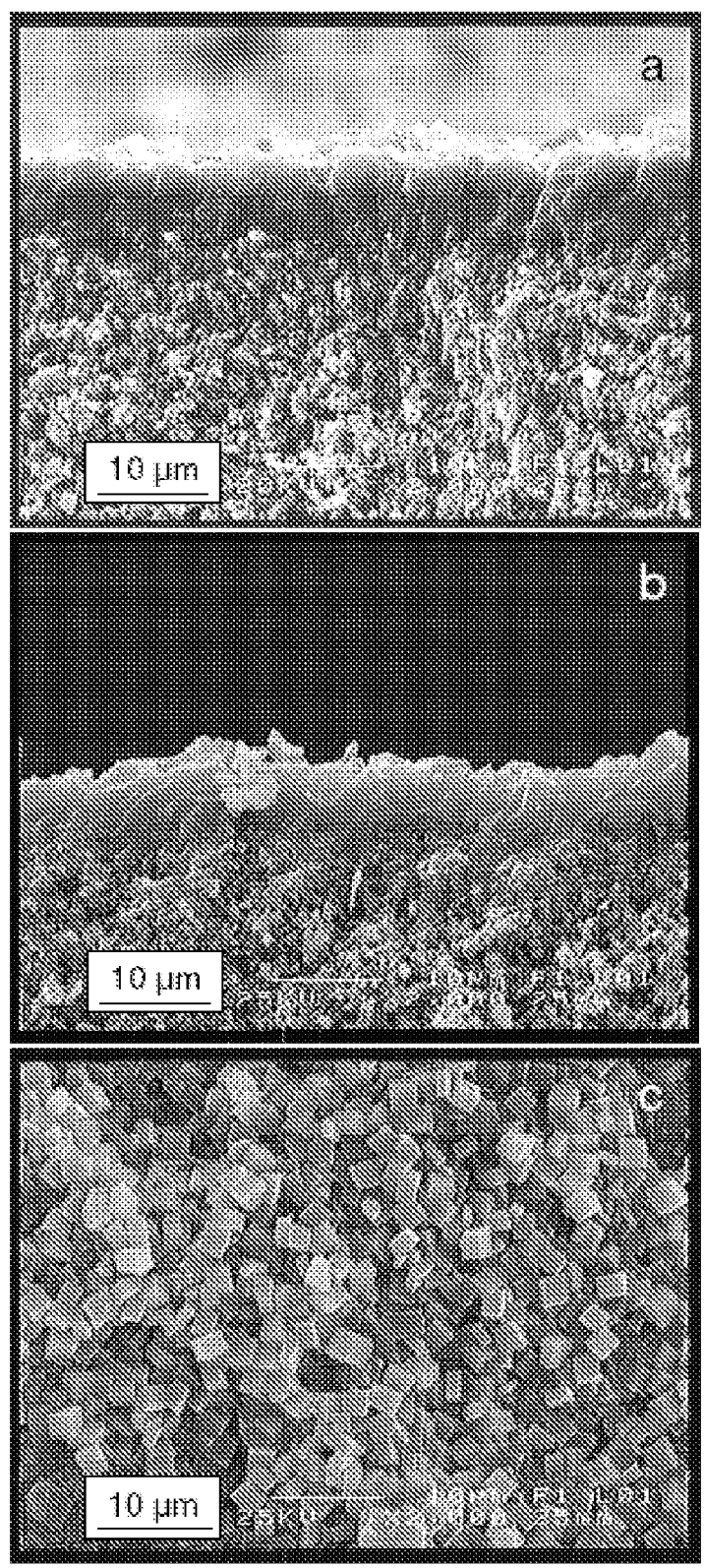
FIGS. 10a-10b are SEM images showing cross sectional views of a 1 layer SAPO-34 membrane (FIG. 10a) and a 2 layer SAPO-34 membrane (FIG. 10b), both prepared on an $\alpha$-$Al_2O_3$ support.
FIG. 10c is an SEM image showing a top view of 1 layer SAPO-34 membrane prepared on an $\alpha$-$Al_2O_3$ support.

FIGS. 10a-10b show cross sectional views of a 1 layer SAPO-34 membrane (FIG. 10a) and a 2 layer SAPO-34 membrane (FIG. 10b), both prepared on an α-$Al_2O_3$ support. FIG. 10c shows a top view of 1 layer SAPO-34 membrane prepared on an α-$Al_2O_3$ support.

A cross-section of an α-$Al_2O_3$ support was analyzed with the scanning electron microscope after membrane synthesis. Few SAPO-34 crystals are attached on the surface α-$Al_2O_3$ layer. More SAPO-34 crystals were attached on the granules of the alumina base. However, crystal inclusion in the pores was minimal.

Example 7

Transport Properties for the SAPO-34 Membranes on Alumina Supports

The compositions of the feed, retentate, and permeate streams were measured using a Hewlett-Packard 5890/series II gas chromatograph equipped with a thermal conductivity detector and HAYESEP-D column (Alltech). The oven, injector, and detector temperatures were all kept at 423 K.

As shown in Table 12, the separation performance was highly dependent on the gel composition and the number of zeolite layers. Membranes prepared with one layer (A1-A4) were about 6 μm thick, whereas membranes prepared with two layers (A5) were ~7.5 μm thick (FIG. 2). The small difference in thicknesses suggests that the first layer partially dissolved during synthesis of the second layer. The second layer increased the $CO_2/CH_4$ selectivity. The membranes had $CO_2/CH_4$ separation selectivities higher than 170, with $CO_2$ permeances as high as ~2×10$^{-6}$ mol/($m_2$·s·Pa) at 295 K and a feed pressure of 224 kPa. The size of zeolite nanocrystals allowed the formation of thin membranes in which crystal inclusion in the pores of α-$Al_2O_3$ supports was minimum.

Also, as shown in Table 12, decreasing the seed crystal size from ~0.82 μm (membranes A1-A2) to 0.68 μm (membranes A3-A5) almost doubled the separation index. The addition of a second layer further improved the separation performance. Table 12 presents $CO_2/CH_4$ separation properties for the SAPO 34 membranes referred to in Table 11. The permeate pressure was 84 kPa and the pressure drop 138 kPa.

TABLE 12

| Membrane | Permeance (mol/($m^2$ · s · Pa)) | | $CO_2/CH_4$ selectivity | Separation Index (π) (mol/$m^2$ s) |
|---|---|---|---|---|
| | $CO_2 \times 10^6$ | $CH_4 \times 10^8$ | | |
| A1 | 1.0 | 1.2 | 86 | 7.4 |
| A2 | 1.0 | 1.1 | 99 | 8.6 |
| A3 | 1.2 | 0.9 | 131 | 13 |
| A4 | 2.0 | 2.3 | 86 | 14 |
| A5 | 1.8 | 1.0 | 171 | 25 |

Figure 11:
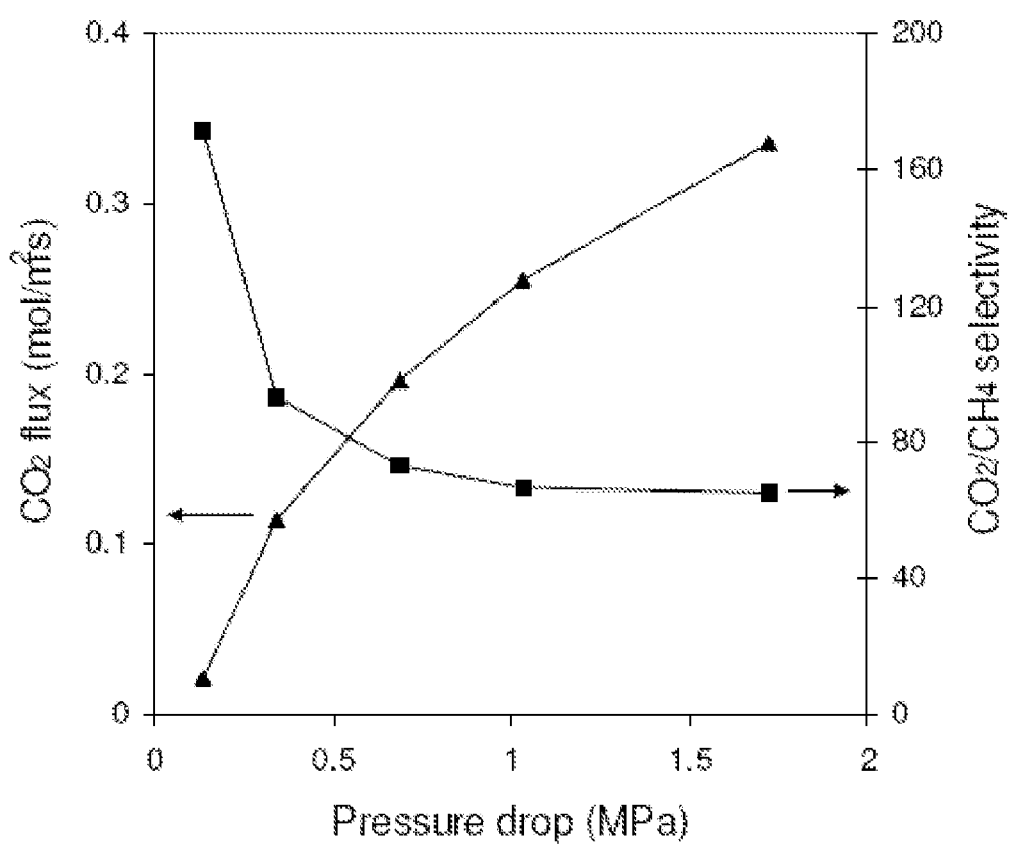
FIG. 11 shows $CO_2$ flux and $CO_2/CH_4$ selectivity for a 50:50 $CO_2/CH_4$ mixture at 295 K as a function of pressure drop for SAPO-34 membrane A5 of Example 7. Permeate pressure 84 kPa.

Membrane A5 was used to separate an equimolar $CO_2/CH_4$ mixture at feed pressures up to 1.7 MPa. Higher pressures were not used to avoid breaking the alumina supports because the membranes were prepared on the inside. These supports can withstand much larger pressure drops if the high pressure is on the outside of the support, and the high permeances reported here might justify preparing SAPO-34 layers on the outside of the alumina support. Since carbon dioxide adsorbs more strongly than $CH_4$, it approached saturation at lower pressure than $CH_4$, so the $CO_2/CH_4$ selectivity decreased as the pressure increased. At a pressure drop of 1.7 MPa, the $CO_2$ permeance was 0.58×10$^{-6}$ mol/($m_2$·s·Pa) and the $CO_2/CH_4$ selectivity was 65, corresponding to a flux of 55 kg/$m_2$/s (FIG. 11). FIG. 11 shows $CO_2$ flux and $CO_2/CH_4$ selectivity for a 50:50 $CO_2/CH_4$ mixture at 295 K as a function of pressure drop for SAPO-34 membrane A5. Permeate pressure 84 kPa.

The invention claimed is:
1. A method for making a crystalline silicoaluminophosphate 34 (SAPO-34) membrane, the method comprising the steps of:
 a) providing a porous support having a surface;
 b) applying a first quantity of SAPO-34 crystalline material to at least part of the surface of the porous support prior to step e), wherein the first quantity of crystalline material is in the form of loose SAPO-34 crystals, the average size of the SAPO-34 crystals being from 0.25 microns to 5.0 microns;
 c) preparing an aqueous SAPO-34 forming gel, wherein the gel comprises aluminum, phosphorus, silicon, oxygen, a first and a second organic templating agent and water, with the ratio of silicon to aluminum being greater than 0.1, wherein the gel composition comprises 1.0 $Al_2O_3$:a$P_2O_5$:b$SiO_2$:c$R_1$:d$R_2$:e$H_2O$ where $R_1$ is a quaternary organic ammonium templating agent, $R_2$ is a primary, secondary or tertiary amine having 12 or fewer carbon atoms and
 a is from 0.6 to 1.4,
 b is greater than 0.2 and less than or equal to 0.8,
 c is greater than 1 and less than or equal to 2.0,
 d is between 1.0 and 3.0, and
 e is from 50 to 100;
 d) aging the gel for at least twenty four hours;
 e) contacting the porous support with the aged gel;
 f) heating the porous support and the gel to form a second quantity of SAPO-34 crystalline material on the support, thereby forming a cumulative layer of SAPO-34 crystals on the surface of the support; and g) calcining the SAPO-34 layer to remove the templating agents.

2. The method of claim 1, wherein in step b) the average size of the SAPO-34 crystals is greater than or equal to the average pore size of the support.

3. The method of claim 1, wherein the pore size is between about 0.1 and about 0.5 microns and the average size of the SAPO-34 crystals in step b) is from is less than or equal to one micron.

4. The method of claim 1, wherein the average size of the SAPO-34 crystals in step b) is from 0.5 microns to 1.0 microns.

5. The method of claim 1, wherein the amine has a molecular weight less than or equal to 300.

6. The method of claim 1, wherein the first templating agent is TEAOH.

7. The method of claim 1, wherein the second templating agent is DPA.

8. The method of claim 1, wherein the gel composition comprises $1.0\ Al_2O_3:aP_2O_5:bSiO_2:cR_1:dR_2:eH_2O$ where $R_1$ is a quaternary organic ammonium templating agent, $R_2$ is a small amine and a is from 0.6 to 1.4,
b is greater than 0.2 and less than or equal to 0.8,
c is greater than 1 and less than or equal to 1.6,
d is between 1.0 and 2.0, and
e is from 50 to 100.

9. The method of claim 8, wherein a is between 0.6 and 1.0, b is between 0.2 and 0.6, c is between 1 and 2, d is between 1 and 2, and e is between 70 and 80.

10. The method of claim 1, wherein the gel is aged from 40° C. to 60° C. prior to step e).

11. The method of claim 10, wherein the gel is aged from 4 days to 28 days.

12. The method of claim 1, wherein in step f) the porous support and the gel are heated to a temperature from 453 K to 553 K for 20 to 25 hours.

13. The method of claim 1, wherein steps e) and f) are repeated until the SAPO layer is substantially impermeable to N2 before performing step g).

14. The method of claim 1, wherein the separation index of the supported membrane is greater than or equal to 5 for an approximately 50/50 $CO_2/CH_4$ mixture at about 295 K, a feed pressure of 222 kPa and a pressure drop of about 138 kPa.

15. A supported membrane comprising SAPO-34 crystals on a porous support made by the method of claim 1, wherein the thickness of the SAPO-34 layer is less than 5 microns, the $CO_2/CH_4$ separation selectivity is greater than 130 and the $CO_2$ permeance is greater than $3.8\times10^{-7}$ mol/(m² s Pa) for an equimolar $CO_2/CH_4$ mixture at 295 K with a feed pressure of 222 kPa and with a pressure differential across the membrane of 138 kPa.

16. The membrane of claim 15, wherein the thickness of the SAPO-34 layer is less than 2 microns.

17. The membrane of claim 15, wherein the separation index is greater than or equal to 5 for an equimolar $CO_2/CH_4$ mixture at 295 K, with a feed pressure of 222 kPa and a pressure drop of 138 kPa.

18. A method for separating a first gas component from a gas mixture containing at least a first and a second gas component, the method comprising the steps of:

a) providing a membrane of claim 15, the membrane having a feed and a permeate side and being selectively permeable to the first gas component over the second gas component;

b) applying a feed stream including the first and the second gas components to the feed side of the membrane; and c) providing a driving force sufficient for permeation of the first gas component through the membrane, thereby producing a permeate stream enriched in the first gas component from the permeate side of the membrane.

19. The method of claim 18, wherein the first gas component is carbon dioxide and the second gas component is methane.

20. A method for making a crystalline silicoaluminophosphate-34 (SAPO-34) membrane, the method comprising the steps of:

a) providing a porous support having a surface whose average pore size is from 0.05 microns to 6.0 microns;

b) applying a first quantity of SAPO-34 crystalline material to at least part of the surface of the porous support prior to step d), wherein prior to its application the first quantity of crystalline material is in the form of loose SAPO-34 crystals, the average size of the crystals being from 0.5 microns to 3.0 microns;

c) preparing an aqueous SAPO-34 forming gel, wherein the gel comprises aluminum, phosphorus, silicon, oxygen, a first and a second organic templating agent and water, with the ratio of silicon to aluminum being greater than 0.1, wherein the gel composition comprises $1.0\ Al_2O_3:aP_2O_5:bSiO_2:cR_1:d_1R_2:d_2R_3:eH_2O$ where $R_1$ is a quaternary organic ammonium templating agent, $R_2$ is a first small primary, secondary or tertiary amine having 12 or fewer carbon atoms and $R_3$ is a second small primary, secondary or tertiary amine having 12 or fewer carbon atoms, and a is from 0.6 to 1.4,
b is greater than 0.2 and less than or equal to 0.8,
c is greater than 1 and less than or equal to 2.0,
$d_1$ is between 0.5 and 1.5,
$d_2$ is between 0.5 and 1.5, and
e is from 50 to 100;

d) aging the gel for at least twenty four hours at a temperature from 40° C. to 60° C.;

e) contacting the porous support with the aged gel;

f) heating the porous support and the gel to form a second quantity of SAPO-34 crystalline material on the support, thereby forming a cumulative layer of SAPO-34 crystals on the surface of the support, wherein the porous support and the gel are heated to a temperature from 453 K to 553 K time for 20 to 25 hours; and g) calcining the SAPO-34 layer to remove the templating agents.

21. The method of claim 1, wherein the SAPO-34 crystals applied in step b) have a blocky morphology.

* * * * *